(12) United States Patent
Faulkner et al.

(10) Patent No.: US 12,027,159 B2
(45) Date of Patent: Jul. 2, 2024

(54) AUTOMATED GENERATION OF FINE-GRAINED CALL REASONS FROM CUSTOMER SERVICE CALL TRANSCRIPTS

(71) Applicant: Capital One Services, LLC, McLean, VA (US)

(72) Inventors: Adam Faulkner, New York, NY (US); Gayle McElvain, Arlington, VA (US); John Qui, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 178 days.

(21) Appl. No.: 17/468,852

(22) Filed: Sep. 8, 2021

(65) Prior Publication Data

US 2022/0383867 A1 Dec. 1, 2022

Related U.S. Application Data

(60) Provisional application No. 63/190,553, filed on May 19, 2021.

(51) Int. Cl.
| | |
|---|---|
| *G10L 15/16* | (2006.01) |
| *G06F 40/35* | (2020.01) |
| *G10L 15/06* | (2013.01) |
| *G10L 15/18* | (2013.01) |

(Continued)

(52) U.S. Cl.
CPC .......... *G10L 15/1822* (2013.01); *G06F 40/35* (2020.01); *G10L 15/063* (2013.01); *G10L 15/16* (2013.01); *G10L 15/1815* (2013.01); *G10L 15/22* (2013.01); *H04M 3/42221* (2013.01); *G10L 2015/0631* (2013.01)

(58) Field of Classification Search
CPC .................................................. H04M 2201/40
See application file for complete search history.

(56) References Cited

U.S. PATENT DOCUMENTS

| | | | |
|---|---|---|---|
| 7,039,166 B1 | 5/2006 | Peterson et al. | |
| 7,904,399 B2 * | 3/2011 | Subramaniam | ..... G10L 15/1822 706/20 |
| 9,961,202 B2 * | 5/2018 | Bellosi | ................ H04M 3/5175 |

(Continued)

OTHER PUBLICATIONS

Angeli, G., et al. "Leveraging Linguistic Structure for Open Domain Information Extraction". In Proceedings of the 53rd Annual Meeting of the Association for Computational Linguistics and the 7th International Joint Conference on Natural Language Processing (vol. 1: Long Papers), Jul. 2015, pp. 344-354.

(Continued)

*Primary Examiner* — Jesse S Pullias
(74) *Attorney, Agent, or Firm* — Sterne, Kessler, Goldstein & Fox P.L.L.C.

(57) ABSTRACT

Embodiments disclosed are directed to a computing system that performs steps to automatically generate fine-grained call reasons from customer service call transcripts. The computing system extracts, using a natural language processing (NLP) technique, a set of events from a set of text strings of speaker turns. The computing system then identifies a set of clusters of events based on the set of events and labels each cluster of events in the set of clusters of events to generate a set of labeled clusters of events. Subsequently, the computing system assigns each event in the set of events to a respective labeled cluster of events in the set of labeled clusters of events.

17 Claims, 13 Drawing Sheets

(51) Int. Cl.
    *G10L 15/22*     (2006.01)
    *H04M 3/42*     (2006.01)

(56) References Cited

U.S. PATENT DOCUMENTS

| | | | | |
|---|---|---|---|---|
| 10,289,967 | B2* | 5/2019 | Stephan | G06Q 10/063 |
| 10,360,305 | B2 | 7/2019 | Larcheveque et al. | |
| 10,498,888 | B1* | 12/2019 | Rute | G06N 20/00 |
| 10,630,840 | B1 | 4/2020 | Karp et al. | |
| 10,839,432 | B1 | 11/2020 | Konig et al. | |
| 2002/0019826 | A1* | 2/2002 | Tan | G06F 16/355 |
| | | | | 707/999.102 |
| 2009/0030862 | A1* | 1/2009 | King | G06F 18/214 |
| | | | | 706/45 |
| 2013/0297688 | A1* | 11/2013 | Zheng | G06Q 50/01 |
| | | | | 709/204 |
| 2019/0180175 | A1* | 6/2019 | Meteer | G10L 15/26 |
| 2022/0012667 | A1* | 1/2022 | Pripstein | G06F 40/216 |

OTHER PUBLICATIONS

Chambers, N., et al. "Unsupervised Learning of Narrative Schemas and their Participants". Association for Computational Linguistics, In Proceedings of the Joint Conference of the 47th Annual Meeting of the ACL and the 4th International Joint Conference on Natural Language Processing of the AFNLP: vol. 2, Aug. 2009, pp. 602-610.
Cheung, J. C. K., et al. "Probabilistic Frame Induction". arXiv preprint arXiv:1302.4813, Jun. 2013, pp. 837-846.
Filippova, K. "Multi-Sentence Compression: Finding Shortest Paths in Word Graphs". Association for Computational Linguistics, In Proceedings of the 23rd International Conference on Computational Linguistics, Aug. 2010, pp. 322-330.
Gashteovski, K., et al. "MinIE: Minimizing Facts in Open Information Extraction". In Proceedings of the 2017 Conference on Empirical Methods in Natural Language Processing, Sep. 2017, pp. 2630-2640.
He, L., et al. "Deep Semantic Role Labeling: What Works and What's Next". In Proceedings of the 55th Annual Meeting of the Association for Computational Linguistics (vol. 1: Long Papers), Jul. 2017, pp. 473-483.
Lee, K., et al. "End-to-end Neural Coreference Resolution". arXiv preprint arXiv:1707.07045, Sep. 2017, pp. 188-197.
Singla, K., et al. "Automatic Community Creation for Abstractive Spoken Conversations Summarization". In Proceedings of the Workshop on New Frontiers in Summarization, 2017, pp. 43-47.
Stepanov, E., et al. "Automatic Summarization of Call-center Conversations". In In Proc. of the IEEE Automatic Speech Recognition and Understanding Workshop (ASRU 2015), pp. 1-2.
Tilk, O., et al. "LSTM for Punctuation Restoration in Speech Transcripts". In Sixteenth annual conference of the international speech communication association, 2015, pp. 683-687.
Weber, N., et al. "Event Representations with Tensor-Based Compositions". In Thirty-Second AAAI Conference on Artificial Intelligence, 2018, pp. 4946-4953.
Granroth-Wilding, M., et al. "What Happens Next? Event Prediction Using a Compositional Neural Network Model". In Proceedings of the Thirtieth AAAI Conference on Artificial Intelligence (AAAI-16), 2016, pp. 2727-2733.
Arachie, et al. "Unsupervised detection of sub-events in large scale disasters". In Proceedings of the AAAI Conference on Artificial Intelligence, 2020, vol. 34; pp. 354-361.
Asgari-Chenaghlu, et al. "Covid-transformer: Detecting trending topics on twitter using universal sentence encoder". arXiv preprint arXiv:2009.03947, 2020, 12 pages.
Bird, et al. "Natural language processing with Python: analyzing text with the natural language toolkit". O'Reilly Media, Inc., 2009, 491 pages.
Cer, et al. "Semeval-2017 task 1: Semantic textual similarity-multilingual and cross-lingual focused evaluation". arXiv preprint arXiv:1708.00055, 2017, 14 pages.
Chang, et al. "Deep learning for sentence clustering in essay grading support". arXiv preprint arXiv:2104.11556, 2021, 9 pages.
Devlin, et al. "Bert: Pre-training of deep bidirectional transformers for language understanding". arXiv preprint arXiv:1810.04805, 2018, 16 pages.
He, et al. "Deep semantic role labeling: What works and what's next". In Proceedings of the 55th Annual Meeting of the Association for Computational Linguistics (vol. 1: Long Papers), 2017, pp. 473-483.
Likas, et al. "The global k-means clustering algorithm". Pattern recognition 36, 2 (2003), pp. 451-461.
Liu, et al. 2019. Roberta: "A robustly optimized bert pretraining approach". arXiv preprint arXiv: 1907.11692 (2019), 13 pages.
Mcinnes, et al. "hdbscan: Hierarchical density based clustering". Journal of Open Source Software 2, 11; available at: https://doi.org/10.21105/joss.00205 (2017), 2 pages.
Rawte, et al. "Hierarchical Contextual Document Embeddings for Long Financial Text Regression". In Proceedings of the 3rd Workshop KDD Workshop on Machine Learning in Finance (with SIGKDD), 2020, 8 pages.
Reimers, et al. "Sentence-bert: Sentence embeddings using siamese bert-networks". arXiv preprint arXiv:1908.10084 (2019), 11 pages.
Sanh, et al. DistilBERT, a distilled version of BERT: smaller, faster, cheaper and lighter. arXiv preprint arXiv:1910.01108 (2019), 5 pages.
Shi, et al. "Simple bert models for relation extraction and semantic role labeling". arXiv preprint arXiv:1904.05255 (2019), 6 pages.
Vaswani, et al. "Attention is all you need". 31st Conference on Neural Information Processing Systems (NIPS), arXiv preprint arXiv:1706.03762 (2017), 15 pages.
Vinh, et al. "Information theoretic measures for clusterings comparison: Variants, properties, normalization and correction for chance". The Journal of Machine Learning Research 11 (2010), pp. 2837-2854.
Walkowiak, et al. "Evaluation of vector embedding models in clustering of text documents". In Proceedings of the International Conference on Recent Advances in Natural Language Processing (RANLP 2019), pp. 1304-1311.
Chambers, N., et al., "Template-Based Information Extraction without the Templates," Association for Computational Linguistics, Proceedings of the 49th Annual Meeting of the Association for Computational Linguistics, Jun. 2011, pp. 976-986.

* cited by examiner

AUTOMATED GENERATION OF FINE-GRAINED CALL REASONS FROM CUSTOMER SERVICE CALL TRANSCRIPTS

CROSS-REFERENCE TO RELATED APPLICATIONS

The present application claims priority to U.S. Provisional Application No. 63/190,553, entitled "AUTOMATED GENERATION OF FINE-GRAINED CALL REASONS FROM CUSTOMER SERVICE CALL TRANSCRIPTS," filed May 19, 2021, the content of which is incorporated by reference herein in its entirety.

TECHNICAL FIELD

Embodiments relate to natural language processing (NLP), specifically a system that automatically generates fine-grained call reasons from customer service call transcripts.

BACKGROUND

Modern call centers receive thousands of calls per day from customers. Many of these call centers use an automatic speech recognition (ASR) system to automatically transcribe these interactions and make them available as searchable transcripts across their enterprise. These transcribed interactions have all of the complexity and ambiguity of natural conversation. Pauses, disfluencies, and filler words are frequent, while the information of interest may be confined to a small segment of text or distributed throughout the transcript. As a result, these transcribed interactions present considerable challenges for conventional natural language processing systems designed to extract meaningful information from such interactions.

SUMMARY

Provided herein are system, apparatus, article of manufacture, method and/or computer program product embodiments, and/or combinations and sub-combinations thereof, for automatically generating fine-grained call reasons from customer service call transcripts.

Several embodiments are directed to computer-implemented methods for automatically generating fine-grained call reasons from customer service call transcripts. For example, a computer-implemented method can include extracting, by an event extraction system using a natural language processing (NLP) technique, a set of events from a set of text strings of speaker turns. The computer-implemented method can further include identifying, by a cluster generation system, a set of clusters of events based on the set of events. The computer-implemented method can further include labeling, by the cluster generation system, each cluster of events in the set of clusters of events to generate a set of labeled clusters of events. The computer-implemented method can further include assigning, by a cluster assignment system, each event in the set of events to a respective labeled cluster of events in the set of labeled clusters of events.

Several embodiments are directed to non-transitory computer readable media for automatically generating fine-grained call reasons from customer service call transcripts. For example, a non-transitory computer readable medium can include instructions for causing a processor to perform operations for automatically generating fine-grained call reasons from customer service call transcripts. The operations can include extracting, using an NLP technique, a set of events from a set of text strings of speaker turns. The operations can further include identifying a set of clusters of events based on the set of events. The operations can further include labeling each cluster of events in the set of clusters of events to generate a set of labeled clusters of events. The operations can further include assigning each event in the set of events to a respective labeled cluster of events in the set of labeled clusters of events.

Several embodiments are directed to computing systems for automatically generating fine-grained call reasons from customer service call transcripts. For example, a computing system can include a storage unit configured to store instructions. The computing system can further include a control unit, coupled to the storage unit, configured to process the stored instructions to extract, using an NLP technique, a set of events from a set of text strings of speaker turns. The control unit can be further configured to process the stored instructions to identify a set of clusters of events based on the set of events. The control unit can be further configured to process the stored instructions to label each cluster of events in the set of clusters of events to generate a set of labeled clusters of events. The control unit can be further configured to process the stored instructions to assign each event in the set of events to a respective labeled cluster of events in the set of labeled clusters of events.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
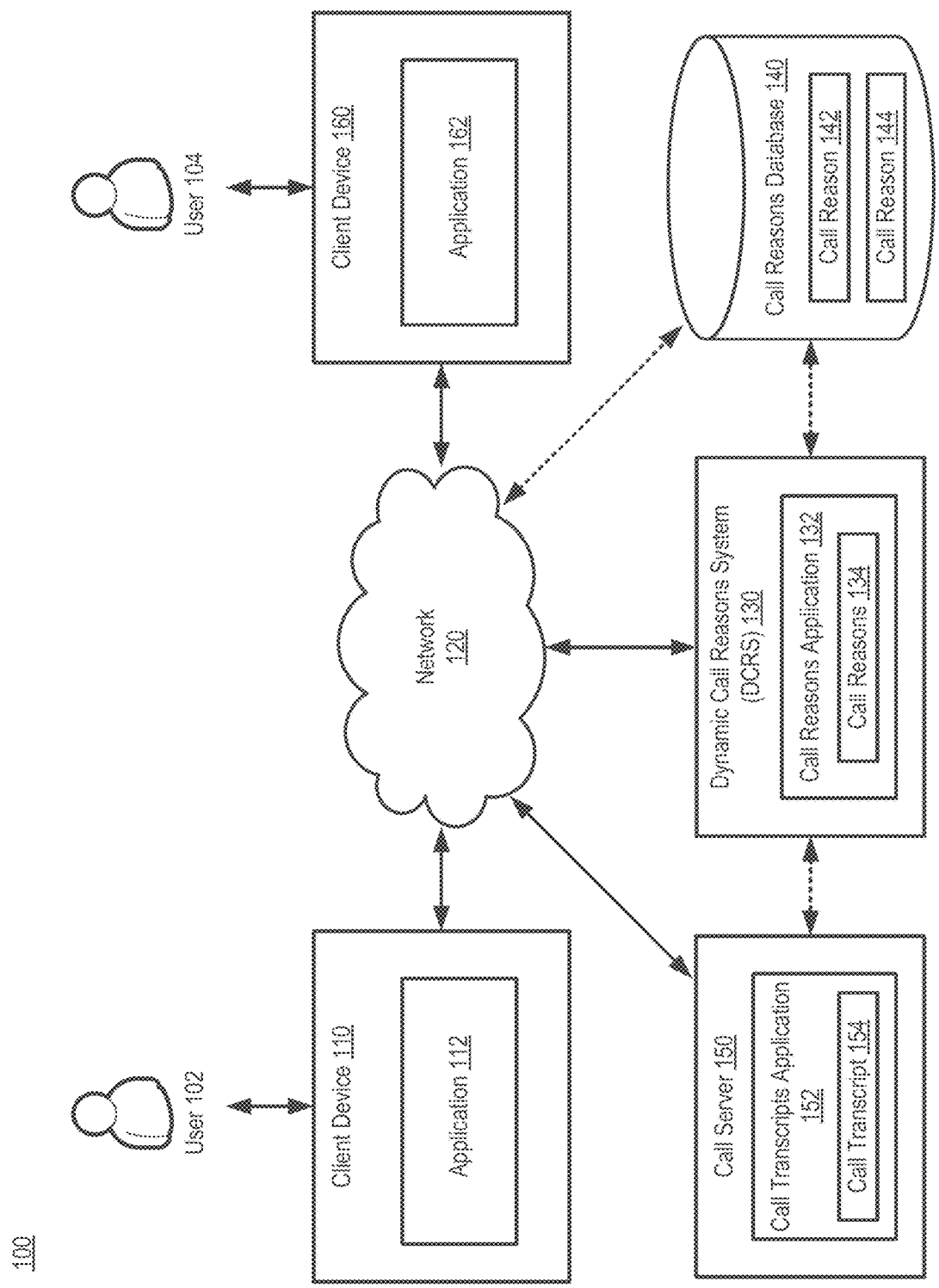
FIG. 1 is an example computing environment including an example dynamic call reasons system (DCRS) for automatically generating fine-grained call reasons from customer service call transcripts according to some embodiments.

Embodiments disclosed herein relate to systems and methods for automatically generating fine-grained call reasons from customer service call transcripts. The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module," "model," or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, models, units, or services in the following description of the embodiments may be coupled to one another as described or as shown. The coupling may be direct or indirect, without or with intervening items between coupled modules, units, or services. The coupling may be by physical contact or by communication between modules, units, or services.

Overview of Systems and Functions

In one example, companies with large call centers have significant interest in how to best serve their customers by reducing hold time, limiting transfers, and eliminating the need for multiple calls about the same issue. There is also untapped potential for these conversations to serve as a source of both implicit and explicit customer feedback for the improvement of products and services. The first step towards these objectives is a robust, scalable approach to identifying the specific purpose of every call. In conventional call centers, call reasons are identified for only a subset of call center interactions. Typically, this involves a simple keyword search over indexed transcripts or the use of a transcript-level text classification model that assigns each transcript a label from a static inventory of call reason types. The former, keyword-search-based approach leverages the analyst's knowledge of an existing call reason trend. For example, if customers in a particular area are currently experiencing a hurricane, an analyst interested in determining the scope of the impact of this event might use a query such as "hurricane, hardship" and manually examine the results. Alternatively, assuming that a label such as "hardship" exists in the inventory of transcript classification model classes, an analyst might simply examine all transcripts labeled "hardship" under the assumption that a certain percentage are likely to involve the event of interest.

There are a number of deficiencies in this process. First, both keyword search-based and classification-based approaches may be constrained by the analyst's knowledge of the event of interest. In the case of keyword search, there may be no way to discover emerging, unknown call reason trends other than laboriously reading through a large number of call transcripts. A classification model-based approach may also be deficient in this setting since it may be substantially impossible to identify a new fine-grained call reason type, such as a hardship-related event, without retraining the classification model with the new call reason type added to the inventory of classification model classes.

Three main methodologies have dominated research in unsupervised extraction and clustering of events: (i) open information extraction; (ii) unsupervised frame or template induction; and (iii) embedding-based approaches. Open information extraction is described in, for example: Angeli, G., et al., "Leveraging Linguistic Structure for Open Domain Information Extraction," Proceedings of the 53rd Annual Meeting of the Association for Computational Linguistics and the 7th International Joint Conference on Natural Language Processing, Volume 1: Long Papers, July 2015, pp. 344-354; and Gashteovski, K., et al., "MinIE: Minimizing Facts in Open Information Extraction," Proceedings of the 2017 Conference on Empirical Methods in Natural Language Processing, September 2017, pp. 2630-2640. Unsupervised frame or template induction is described in, for example: Chambers, N., et al., "Unsupervised Learning of Narrative Schemas and their Participants," Association for Computational Linguistics, Proceedings of the Joint Conference of the 47th Annual Meeting of the ACL and the 4th International Joint Conference on Natural Language Processing of the AFNLP: Volume 2, August 2009, pp. 602-610; and Cheung, J. C. K., et al., "Probabilistic Frame Induction," arXiv preprint arXiv:1302.4813, June 2013, pp. 837-846. Embedding-based approaches is described in, for example: Cheung et al. (cited above); and Weber, N., et al., "Event Representations with Tensor-Based Compositions," 32nd AAAI Conference on Artificial Intelligence, 2018, pp. 4946-4953.

In one example, open information extraction (OpenIE) systems extract relation tuples, such as "<Mark Zuckerberg, founded, Facebook>" from large text corpora in an unsupervised, domain-independent manner. No manually-tagged text is provided and the approach can be used in a range of textual domains, such as newswire, textbooks, and social media posts. These tuples can then be used in various tasks such as querying (e.g., "Who founded Facebook?") or knowledge base extension (e.g., the pattern "<?, founded, ?>" can be used to discover "<Bill Gates, founded, Microsoft>," etc.). However, these OpenIE systems have several shortcomings. First, OpenIE models are unable to capture lexical variation in any of the arguments included in the <arg1, relation, arg2> triples returned. For instance, given the sentences "The customer requested a reduced APR" and "The cardholder wants to lower their APR," an OpenIE model will return the tuple "<The customer, requested, a reduced APR>" for the first sentence and "<The cardholder, wants to, lower their APR>" plus "<The cardholder, lower, their APR>" for the second sentence. Thus, OpenIE fails to capture the fact that both sentences refer to the same event. Second, OpenIE output is limited to three arguments. In particular, OpenIE models return three-member tuples and thus the events extracted must always take the form <arg1, relation, arg2>, where the "relation" arg is usually a verb.

In another example, unsupervised frame or template induction approaches aim to discover both frames (also referred to as "templates") and the participants in those frames without guidance from handcrafted rules or predefined frames. A frame can be a narrative schema containing placeholders for participants. An "arrest" frame, for example, can contain participant slots for roles such as "police," "suspect," and "location," which could potentially be filled by the participants "the police officer," "a suspicious-looking man," and "Brooklyn," respectively. In the approach to this task described by Chambers et al. (2009) (cited above), coreferring arguments in chains of verbs are used to learn event frames. Slots in these frames are automatically filled by extracting noun phrases in sentences previously identified as good targets for a specific frame and assigning them to particular roles using heuristics. However, one shortcoming of Chambers et al. (2009) is that the learned event schemas consist of binary relationships (e.g., A owns B, A buys B) and thus have the same coarse-grainedness issue identified above for the OpenIE approach. Additionally, Chambers, N., et al., "Template-Based Information Extraction without the Templates," Association for Computational Linguistics, Proceedings of the 49th Annual Meeting of the Association for Computational Linguistics, June 2011, pp. 976-986, introduces templates with more than three slots but relies on static knowledge bases such as WordNet or named entity recognizer (NER) models to induce semantic roles. For instance, as described at pages 980-981 of Chambers et al. (2011), role labels are induced using WordNet synsets and the returned named entity labels of an NER model. However, Chambers et al. (2011)'s approach cannot handle out-of-vocabulary terminology since the resources used (e.g., a hand constructed word taxonomy in the case of WordNet; training data with labeled named entities in the case of NER) cannot be updated on-the-fly. Thus, in early 2020, the noun "COVID 19" would not be resolved to a VIRUS semantic role in the approach described in Chambers et al. (2011) because the noun "COVID 19" would have been considered out-of-vocabulary.

Continuing this example, in the probabilistic approach of Cheung et al. (cited above), the solution setting is generative in that frames and participants are viewed as latent topics and the task is to find the distribution of frames and participants that best explain the observed data. Regardless of the approach taken, all results in the above systems are evaluated on clean, standard English text. In fact, many of the key preprocessing steps used in these systems, particularly syntactic parsing and coreference resolution, rely on well-formed text (e.g., the New York Times section of the Gigaword corpus) to achieve their best results. However, Cheung et al.'s approach is unable to capture complex events such as "customer_request_apr_reduction_because_of_unemployment" since, as mentioned in section 3.1 of Cheung et al., the arguments for the "frames" induced by their method never cross clausal boundaries. For example, the sentence "Customer requests an APR reduction because they are unemployed" has two clauses: "Customer requests an APR" and "they are unemployed," separated by the causal connective "because." Cheung et al. would produce two separate frames for this sentence, one for each clause.

In yet another example, a more recent approach to this task involves learning neural event representations which are designed to capture interactions between entities in an event representation. For instance, in Weber et al. (cited above), event schemas are automatically generated by first extracting predicate-argument tuples form newswire text using an off-the shelf OpenIE system, generating events for these tuples using a role factor network, and, finally, using these embeddings to generate novel event schemas with a nearest-neighbors-based heuristic. However, the Weber et al. approach induces event schemas consisting of binary relationships (e.g., A owns B, A buys B) and thus has the same coarse-grainedness issue identified above for the OpenIE approach.

In contrast, several system, apparatus, method, and computer program product embodiments of the present disclosure can address these challenges using an information extraction system configured to (a) identify meaningful units of text associated with customer problem statements (CPSs) (e.g., statements that express a customer's reason for calling) or the context surrounding those statements, (b) cluster the CPSs using features gleaned from distributional information present in the transcripts, and (c) provide a label for each cluster that generalizes the lexical variation found in the cluster into a human-readable string. These labels can then be leveraged as an analytics solution to provide insight into the occurrence of fine-grained call reasons relative to particular time periods or can be used to create call metadata to aid in search. In several embodiments, the logical flow of the information extraction system can be divided into five steps: (i) transcript processing and classification; (ii) speaker turn preprocessing; (iii) event extraction; (iv) cluster assignment; and (v) cluster generation.

Unlike the approaches described above (e.g., OpenIE, Chambers et al. (2009), Chambers et al. (2011), Cheung et al., Weber et al.), the system, apparatus, method, and computer program product embodiments of the present disclosure can generalize the lexical variation (e.g., customer/card holder, wants to/requested, etc.) found in the two sentences "The customer requested a reduced APR" and "The cardholder wants to lower their APR" by first reducing the sentences to an SRL parse, clustering them, and then providing a label that generalizes the lexical variation found in the SRL parses. This label more accurately captures the fact that both sentences describe the same event, for example, "customer_request_APR_reduction." Further, the system, apparatus, method, and computer program product embodiments of the present disclosure can start with SRL parses of any arity, not just three, and thus, after clustering and labeling, can capture more complex events than captured by <arg1, relation, arg2> triples. For example, the system, apparatus, method, and computer program product embodiments of the present disclosure can capture events that contain crucial context such as the customer's reason for requesting an APR reduction, which could be rendered as "customer_request_apr_reduction_because_of_unemployment." Further still, the system, apparatus, method, and computer program product embodiments of the present disclosure do not rely on static resources and thus can induce new events—even events containing never-before-seen vocabulary—on-the-fly and/or dynamically.

There are many exemplary aspects (e.g., advantages) to the systems, apparatuses, methods, and computer program products disclosed herein. For example, embodiments of the present disclosure provide for automatically identifying one or more call reasons for 100% of call center interactions. In another example, in contrast to OpenIE, embodiments of the present disclosure can identify call reasons utilizing a task setting that processes event tuples (i) related to a specific topic, customer problem statements, and (ii) of any arity. In yet another example, embodiments of the present disclosure can identify call reasons utilizing a text domain that consists of noisy ASR output of generally non-standard conversational English, where conventional parsing output would be ill-formed or non-existent. In still another example, embodiments of the present disclosure can: utilize a text domain that consists of call center transcripts, rather than newswire, when utilizing neural event representations as features for clustering events; utilize SRL parsing and leave argument arity unspecified; and perform at scale by assigning incoming transcripts to existing clusters rather than re-clustering the entire dataset with each new transcript. As a result, embodiments of the present disclosure: are not constrained by the analyst's knowledge of the event of interest; can discover emerging, unknown call reason trends without having to manually read through a large number of call transcripts; and can identify a fine-grained call reason type such as a hardship-related event related to whether that event is unattested in a model's cluster label inventory without retraining the model on data labeled with this new, unattested call reason type.

FIG. 1 is an example system 100 for automatically generating fine-grained call reasons from customer service call transcripts according to some embodiments. In several embodiments, system 100 can include a client device 110 associated with a user 102, a client device 160 associated with a user 104, a network 120, a call server 150, a dynamic call reasons system (DCRS) 130, and a call reasons database 140. In several embodiments, the client device 110 can include an application 112, and the client device 160 can include an application 162, the call server 150 can include a call transcripts application 152, and the DCRS 130 can include a call reasons application 132.

The client device 110 and the client device 160 may be any of a variety of centralized or decentralized computing devices. For example, one or both of the client device 110 and the client device 160 may be a mobile device, a laptop computer, or a desktop computer. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 may refer to a discrete software that provides some specific functionality. For example, the application 112 and the application 162 each may be a mobile application that allows the user 102 to perform some functionality, whereas the application 162 may be a mobile application that allows the user 104 to perform some functionality. In other embodiments, one or more of the application 112 and the application 162 may be a desktop application that allows the user 102 or the user 104 to perform the functionalities described herein. In still other embodiments, one or more of the application 112 and the application 162 may be an application that allows the user 102 or the user 104 to call or electronically chat with the call server 150.

In several embodiments, the client device 110 and the client device 160 can be coupled to the call server 150 via a network 120. The call server 150 may be part of a call center computing infrastructure, including a server infrastructure of a company or institution, to which the application 112 and the application 162 belong. While the call server 150 is described and shown as a single component in FIG. 1, this is merely an example. In several embodiments, the call server 150 can include a variety of centralized or decentralized computing devices. For example, the call server 150 may include a mobile device, a laptop computer, a desktop computer, grid-computing resources, a virtualized computing resource, cloud computing resources, peer-to-peer distributed computing devices, a server farm, or a combination thereof. The call server 150 may be centralized in a single room, distributed across different rooms, distributed across different geographical locations, or embedded within the network 120. While the devices including the call server 150 can couple with the network 120 to communicate with the client device 110 and the client device 160, the devices of the call server 150 can also function as stand-alone devices separate from other devices of the system 100.

In several embodiments, the call server 150 can couple to the client device 110 to allow the application 112 to function. For example, in several embodiments, both the client device 110 and the call server 150 can have at least a portion of the application 112 installed thereon as instructions on a non-transitory computer readable medium. The client device 110 and the call server 150 can both execute portions of the application 112 using client-server architectures, to allow the application 112 to function.

In several embodiments, the call server 150 can couple to the client device 160 to allow the application 162 to function. For example, in several embodiments, both the client device 160 and the call server 150 can have at least a portion of the application 162 installed thereon as instructions on a non-transitory computer readable medium. The client device 160 and the call server 150 can both execute portions of the application 162 using client-server architectures, to allow the application 162 to function.

In several embodiments, the call server 150 can be coupled to the DCRS 130 directly or indirectly via the network 120. The DCRS 130 may be part of a call center computing infrastructure, including a server infrastructure of a company or institution, to which the call server 150 belongs. While the DCRS 130 is described and shown as a single component in FIG. 1, this is merely an example. In several embodiments, the DCRS 130 can include a variety of centralized or decentralized computing devices. For example, the DCRS 130 may include a mobile device, a laptop computer, a desktop computer, grid-computing resources, a virtualized computing resource, cloud computing resources, peer-to-peer distributed computing devices, a server farm, or a combination thereof. The DCRS 130 may be centralized in a single room, distributed across different rooms, distributed across different geographical locations, or embedded within the network 120. While the devices including the DCRS 130 can couple with the network 120 to communicate with the call server 150, the devices of the DCRS 130 can also function as stand-alone devices separate from other devices of the system 100.

In several embodiments, if one or both of the call server 150 and the DCRS 130 is implemented using cloud computing resources, the cloud computing resources may be resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In several embodiments, the network 120 can include a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (WiFi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 160, the call server 150, and the DCRS 130 as end points of the network 120. This, however, is an example and it is to be understood that the system 100 can have a different partition between the client device 110, the client device 160, the call server 150, the DCRS 130, and the network 120. For example, the client device 110, the client device 160, the call server 150, and the DCRS 130 can also function as part of the network 120.

In one illustrative and non-limiting embodiment, a user 102 (e.g., a customer) can use the client device 110 to call into the call server 150. The call server 150 can use the call transcripts application 152 to generate a call transcript 154 that includes the interaction with the user 102 and, in several embodiments, millions of other customer interactions. The call server 150 can transmit the call transcript 154 to the DCRS 130. The DCRS 130 can receive the call transcript 154 from the call server 150 and generate, using the call reasons application 132, call reasons 134 for the interactions included in the call transcript 154. For example, the DCRS 130 can identify call reasons 134 for the calls transcribed in the call transcript 154 and store the call reasons 134 in the call reasons database 140. The DCRS 130 can then assign each extracted event to a respective call reason. Subsequently, a user 104 (e.g., an analyst) can use the client device 160 to access the DCRS 130, perform search over call transcripts, and view metadata such as the call timestamp and, with the integration of DCR, fine-grained call reasons extracted from one or more transcripts.

In several embodiments, the call reasons database 140 may be a database or repository used to store call reasons, any other suitable data, or any combination thereof. For example, the call reasons database 140 can store, in a list or as table entries, a call reason 142 (e.g., an existing call reason), and a call reason 144 (e.g., a new call reason generated automatically by the DCRS 130).

Figure 2:
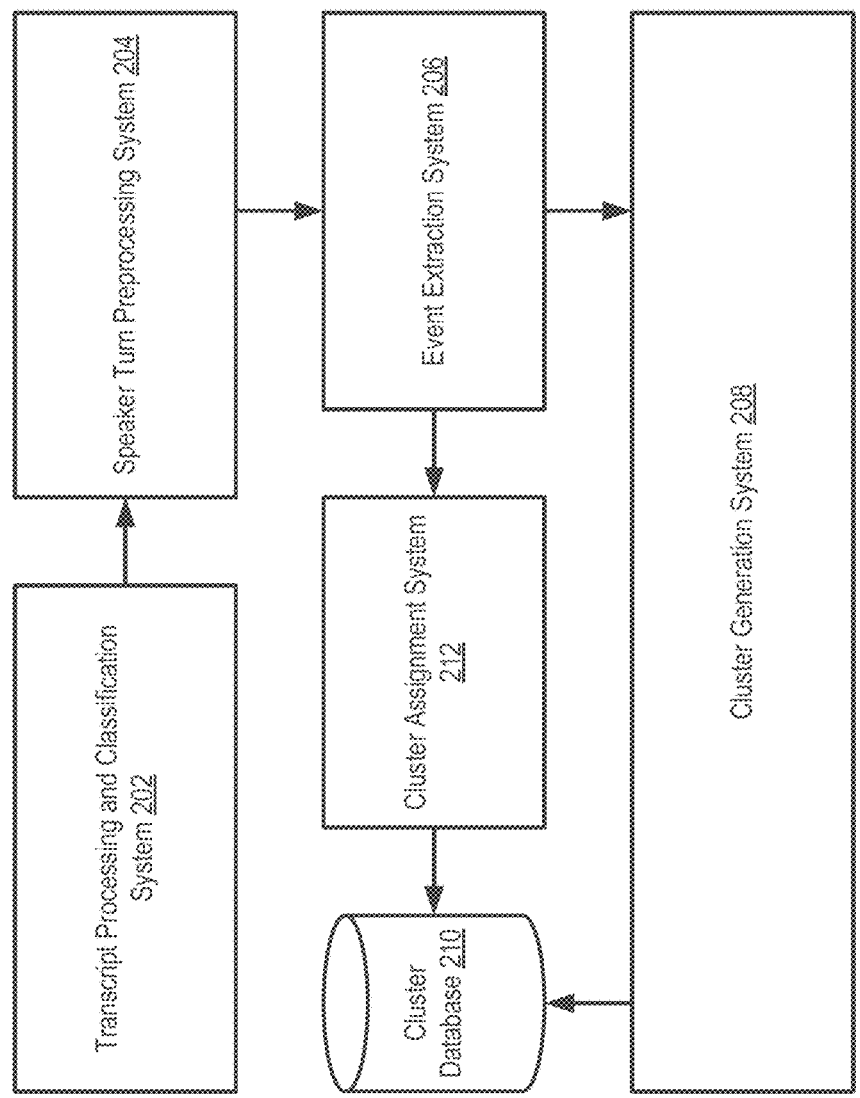
FIG. 2 illustrates various portions of an example DCRS according to some embodiments.

FIG. 2 is a block diagram of a DCRS 200 for automatically generating fine-grained call reasons from customer service call transcripts according to some embodiments. In several embodiments, DCRS 200 may be an extended configuration of the DCRS 130 and the call reasons database 140 described with reference to FIG. 1 that includes additional or alternative functionality. As shown in FIG. 2, DCRS 200 can include a transcript processing and classification system 202, a speaker turn preprocessing system 204, an event extraction system 206, a cluster generation system 208, a cluster database 210, and a cluster assignment system 212.

In several embodiments, the transcript processing and classification system 202, the speaker turn preprocessing system 204, and the event extraction system 206 can transform call transcripts into event representations. These events can then be clustered, labeled, and stored in the cluster database 210 by the cluster generation system 208. Subsequently, new incoming transcripts can be assigned to one or more of these clusters by the cluster assignment system 212. In several embodiments, the operations performed by the transcript processing and classification system 202, the speaker turn preprocessing system 204, and the event extraction system 206 can be executed in a serial manner. In several embodiments, the events output by the event extraction system 206 can serve as input for both the cluster generation system 208 (e.g., for cluster generation) and the cluster assignment system 212 (e.g., for cluster assignment). In several embodiments, cluster generation by the cluster generation system 208 can be run in an offline manner over a corpus of transcripts and cached as stored clusters in the cluster database 210. These stored results can then be used for cluster assignment by the cluster assignment system 212. For example, an incoming transcript can be passed through the transcript processing and classification system 202, the speaker turn preprocessing system 204, and the event extraction system 206, and cluster labels can be assigned by the cluster assignment system 212 to that transcript using textual similarity metrics.

In several embodiments, the transcript processing and classification system 202 can be configured to receive (e.g., from the call server 150 shown in FIG. 1) call transcripts and extract text strings of speaker turns from those call transcripts. In several embodiments, the speaker turn preprocessing system 204 can be configured to clean, autopunctuate, and resolve co-references in the text strings of speaker turns extracted by the transcript processing and classification system 202.

In several embodiments, the event extraction system 206 can be configured to extract, using an NLP technique, events from the cleaned, autopunctuated, and co-reference resolved text strings of speaker turns generated by the speaker turn preprocessing system 204. In some embodiments, each event can include a constituent phrase having a subject, a verb, and an object.

In one example, the event extraction system 206 can be configured to feed the cleaned, autopunctuated, and co-reference resolved text strings of speaker turns to a logistic regression classifier trained to generate a set of probability values that includes a respective probability value for each speaker turn indicative of a likelihood that the speaker turn contains natural language expressing a call reason. The event extraction system 206 can be further configured to extract each event from a respective speaker turn in a respective text string of speaker turns having a highest-ranking respective probability value.

In another example, the event extraction system 206 can be configured to feed the cleaned, autopunctuated, and co-reference resolved text strings of speaker turns to a semantic role labeling parser trained, using a deep highway LSTM neural network, to assign a respective semantic role result to each predicate in each sentence found in each speaker turn. In one example, for every predicate (e.g., verb) in every sentence of a speaker turn, the semantic role labeling parser can return a parse for that predicate. The parse itself can consist of a predicate and its arguments. These arguments can, for example, be the subject and object arguments of the predicate. Accordingly, for "I lost my card," the parse can be [Subject="I", predicate="lost", object="my card"]. The event extraction system 206 can be further configured to extract the events based on the respective semantic role results assigned to each speaker turn in the cleaned, autopunctuated, and co-reference resolved text strings of speaker turns. For example, multiple parses can be returned for a speaker turn, one for each predicate.

In several embodiments, the cluster generation system 208 can be configured to identify clusters of events based on the events extracted by the event extraction system 206. For example, the cluster generation system 208 can be configured to feed the extracted events to a role factor network trained to generate event embeddings that capture (i) distributional information associated with the extracted events and (ii) interactions between arguments within the extracted events. The cluster generation system 208 can be further configured to identify the clusters of events based on the event embeddings.

In several embodiments, the cluster generation system 208 can be configured to label each of the generated clusters of events. For example, the cluster generation system 208 can be configured to label each cluster of events using a graph-based sentence compression algorithm that generalizes lexical variations in the events of each cluster of events. In several embodiments, the cluster generation system 208 can be configured to store the labeled clusters of events in the cluster database 210.

In several embodiments, the cluster assignment system 212 can be configured to assign each event extracted by the event extraction system 206 to a respective labeled cluster of events stored in the cluster database 210.

In several embodiments, the labeled clusters of events generated by the cluster generation system 208 can include one or more new labeled clusters of events that were not previously stored in the cluster database 210. For example, prior to the generation of the one or more new labeled clusters of events, the cluster assignment system 212 can be configured to assign the event to a first label. Subsequently, after the generation of the one or more new labeled clusters of events, the cluster assignment system 212 can be configured to re-assign the event to a second labeled cluster of events (e.g., a newly generated labeled cluster of events) different from the first labeled cluster of events.

In one illustrative and nonlimiting example, in early January 2020, the transcript processing and classification system 202 could have received a call transcript (e.g., a call transcript containing the first indication that a user is suffering from a problem) including a speaker turn stating that a user is suffering from flu-like symptoms, and the cluster assignment system 212 could have assigned, based on the labeled clusters of events then stored in the cluster database 210, an "illness" label indicative of a non-specific illness cluster of events to a first event extracted by the event extraction system 206 from a cleaned, autopunctuated, and co-reference resolved text string of speaker turns generated by the speaker turn preprocessing system 204 based on a text string of speaker turns generated by the transcript processing and classification system 202 based on the first call transcript. Then, in late March 2020, the DCRS 200 can receive a plurality of call transcripts including speaker turns stating that users are suffering from the coronavirus disease 2019 (COVID-19), and the cluster generation system 208 can generate a new "COVID-19" label indicative of a new COVID-19 cluster of events and store the new "COVID-19" label in the cluster database 210. The cluster assignment system 212 can assign the new "COVID-19" label to events extracted from cleaned, autopunctuated, and co-reference resolved text strings of speaker turns generated by the speaker turn preprocessing system 204 based on text strings of speaker turns generated by the transcript processing and classification system 202 based on the plurality of call transcripts. Subsequently, after the generation and storage of the new "COVID-19" label in the cluster database 210, the cluster assignment system 212 can re-assign the first event from the "illness" label to the new "COVID-19" label.

Figure 3:
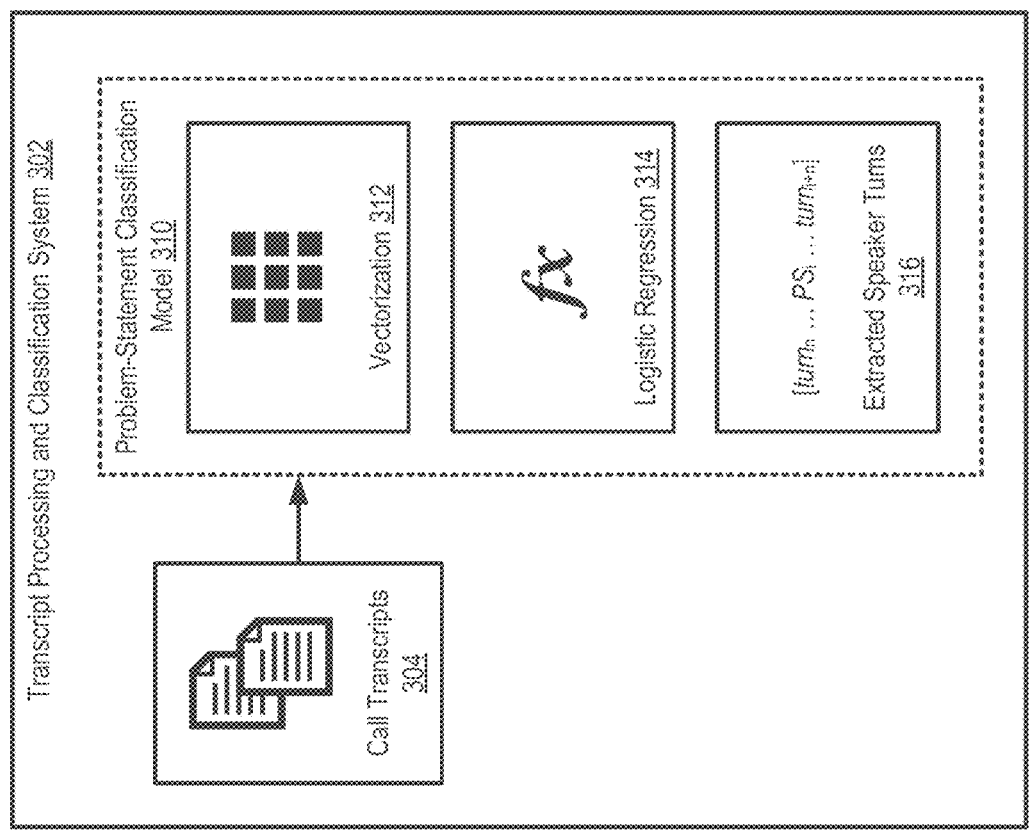
FIG. 3 illustrates a portion of an example DCRS according to some embodiments.

FIG. 3 is a block diagram of an example portion of a DCRS 300 for automatically generating fine-grained call reasons from customer service call transcripts according to some embodiments. In several embodiments, the DCRS 300 may be an extended configuration of the DCRS 130 described with reference to FIG. 1 and/or the DCRS 200 described with reference to FIG. 2 that includes additional or alternative functionality. As shown in FIG. 3, the DCRS 300 can include a transcript processing and classification system 302.

In several embodiments, the transcript processing and classification system 302 can be configured to receive call transcripts 304 and extract text strings of speaker turns from those call transcripts in the form of extracted speaker turns 316. For example, the transcript processing and classification system 302 can pull call transcripts 304 (e.g., call center transcripts in json format, any other suitable format, or any combinations thereof) from a data source (e.g., call server 150 shown in FIG. 1). The transcript processing and classification system 302 can utilize a problem-statement classification model 310 to perform vectorization 312 to transform each call transcript into a data-structure that concatenates consecutive, same-speaker utterances to generate an array of speaker turns. The transcript processing and classification system 302 can then utilize the problem-statement classification model 310 to perform, utilizing a logistic regression classifier (e.g., a problem-statement classifier), logistic regression 314 to assign a score to each speaker turn indicating the probability that the turn contains language expressing call reasons. The transcript processing and classification system 302 can then generate extracted speaker turns 316, which can be a transcript turn containing call reasons, n preceding turns, and m succeeding turns, where n represents an integer value greater than or equal to zero (e.g., n=1, 2, or any other suitable integer value), and where m represents an integer value greater than or equal to zero (e.g., m=1, 2, or any other suitable integer value; optionally, m=n). In several embodiments, the extracted speaker turns 316 contain the highest-ranked turn. Subsequently, the transcript processing and classification system 302 can transmit the extracted speaker turns 316 to a speaker turn preprocessing system (e.g., speaker turn preprocessing system 402 shown in FIG. 4).

Figure 4:
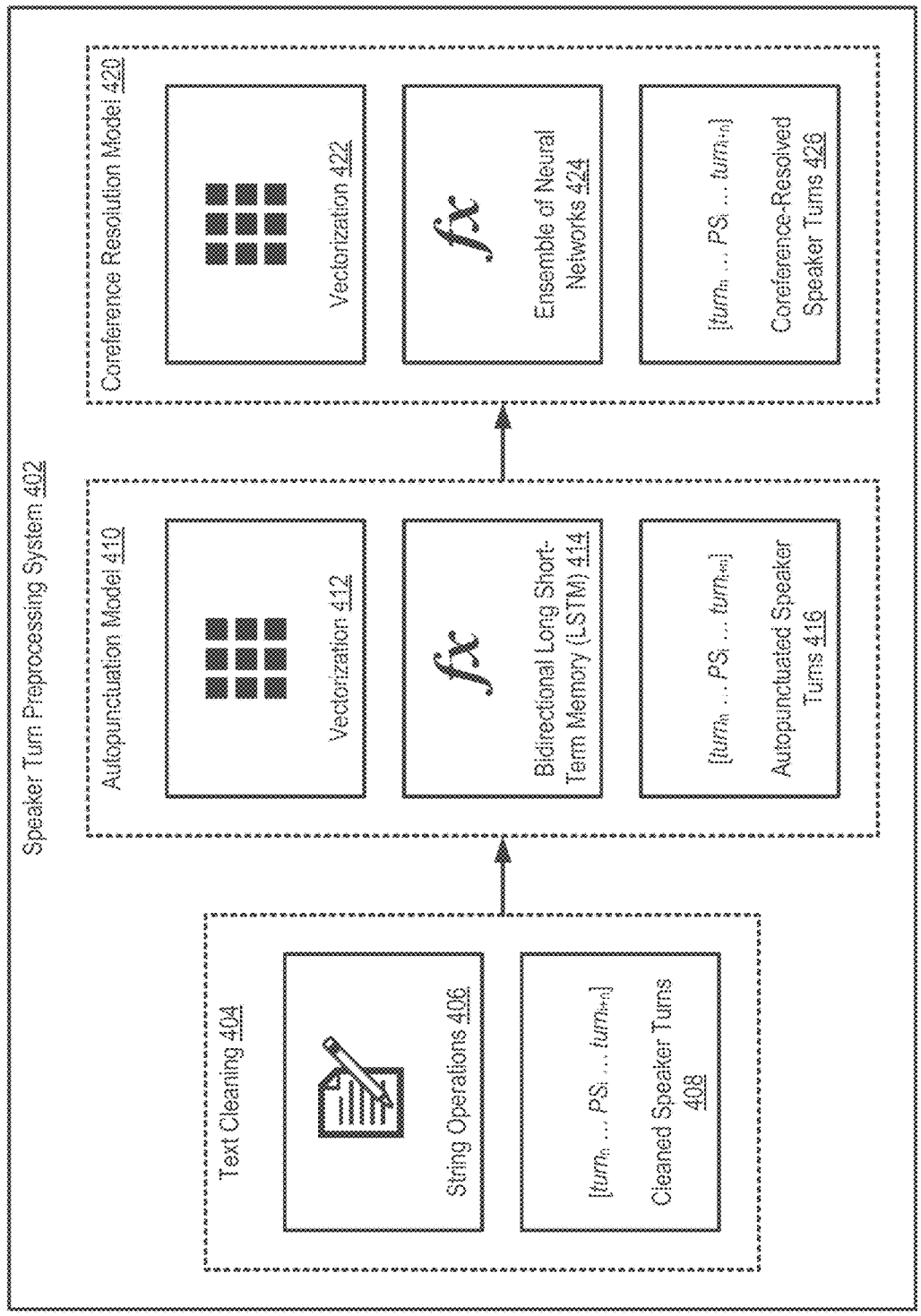
FIG. 4 illustrates another portion of an example DCRS according to some embodiments.

FIG. 4 is a block diagram of an example portion of a DCRS 400 for automatically generating fine-grained call reasons from customer service call transcripts according to some embodiments. In several embodiments, the DCRS 400 may be an extended configuration of the DCRS 130 described with reference to FIG. 1 and/or the DCRS 200 described with reference to FIG. 2 that includes additional or alternative functionality. As shown in FIG. 4, the DCRS 400 can include a speaker turn preprocessing system 402.

In several embodiments, the speaker turn preprocessing system 402 can be configured to clean, autopunctuate, and resolve co-references in the text strings of speaker turns extracted by a transcript processing and classification system (e.g., the extracted speaker turns 316 generated by the transcript processing and classification system 302 shown in FIG. 3). For example, the speaker turn preprocessing system 402 can perform text cleaning 404 to clean speaker turn text extracted via transcript processing and classification of fillers and disfluencies using string operations 406 (e.g., handcrafted rules) to generate cleaned speaker turns 408. The speaker turn preprocessing system 402 can utilize an autopunctuation model 410 to perform vectorization 412 and assign punctuation using a bidirectional LSTM 414 to generate autopunctuated speaker turns 416. The autopunctuation model 410 can be, for example, an autopunctuation model as described in, for example: U.S. patent application Ser. No. 17/030,827, filed Sep. 24, 2020, and titled "Efficient Automatic Punctuation With Robust Inference," the entirety of which is hereby incorporated by reference; and U.S. Provisional Patent Application Ser. No. 63/009,391, filed Apr. 13, 2020, and titled "Automatic Text Punctuation Using Non-Sequential Neural Networks," the entirety of which is hereby incorporated by reference. The bidirectional LSTM 414 can be, for example, a bidirectional LSTM as described in, for example, Tilk, O., et al., "LSTM for Punctuation Restoration in Speech Transcripts." 16th Annual Conference of the International Speech Communication Association, 2015, pp. 683-687, the entirety of which is hereby incorporated by reference.

Continuing the example, the speaker turn preprocessing system 402 can utilize a coreference resolution model 420 to perform vectorization 422 and replace selected pronouns with their antecedents using an ensemble of neural networks 424 to generate coreference-resolved speaker turns 426. The ensemble of neural networks 424 can be, for example, an ensemble of neural networks as described in, for example, Lee, K., et al., "End-to-end Neural Coreference Resolution," arXiv preprint arXiv:1707.07045, September 2017, pp. 188-197, the entirety of which is hereby incorporated by reference. In several embodiments, the coreference resolution model 420, by generating the coreference-resolved speaker turns 426, allows downstream components to extract as much information as possible from the raw text. For example, given the text "I'm calling about my wife's card. She lost her card," coreference resolution of "she" with its antecedent "my wife" allows later components to recover the more informative "my wife lost her card" from the text rather than simply "she lost her card." Subsequently, the speaker turn preprocessing system 402 can transmit the coreference-resolved speaker turns 426 to an event extraction system (e.g., event extraction system 502 shown in FIG. 5).

Figure 5:
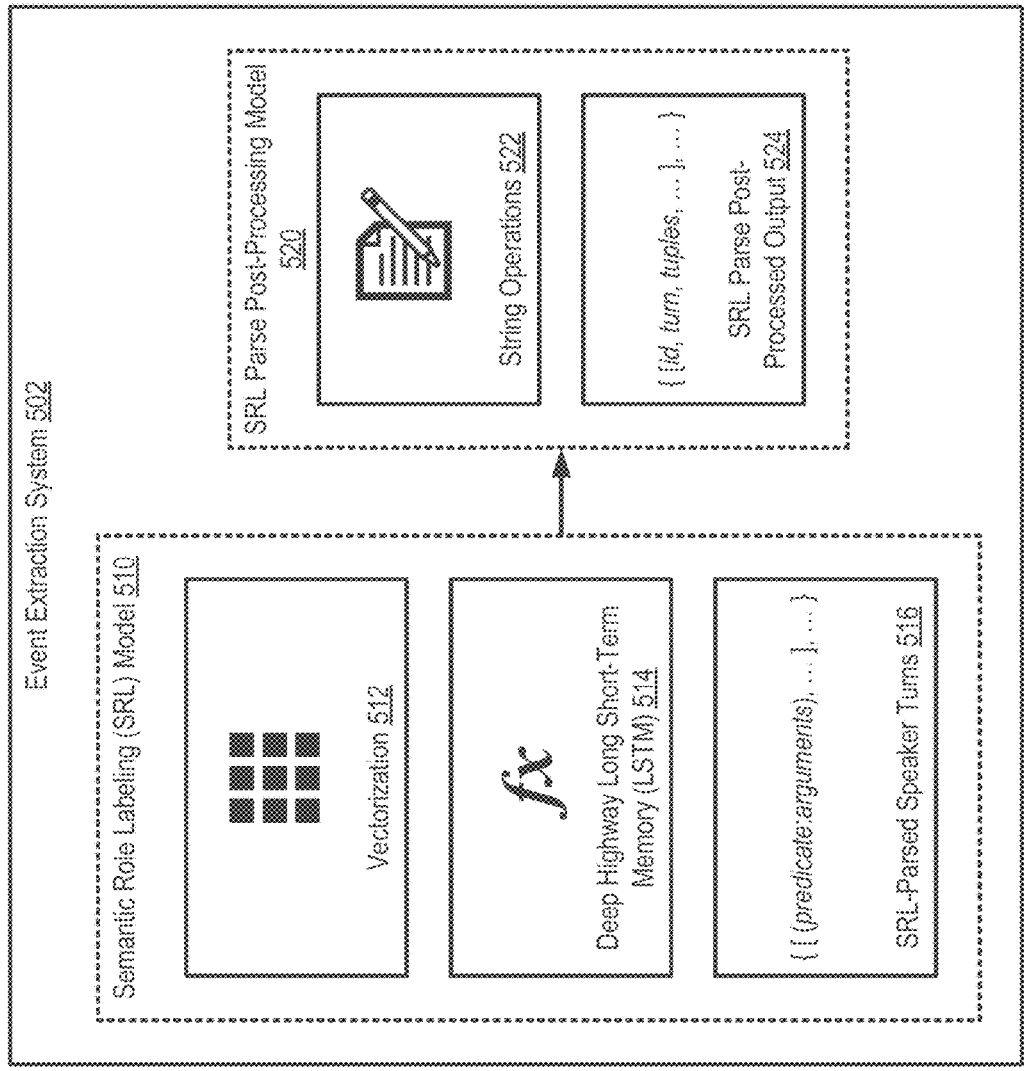
FIG. 5 illustrates another portion of an example DCRS according to some embodiments.

FIG. 5 is a block diagram of an example portion of a DCRS 500 for automatically generating fine-grained call reasons from customer service call transcripts according to some embodiments. In several embodiments, the DCRS 500 may be an extended configuration of the DCRS 130 described with reference to FIG. 1 and/or the DCRS 200 described with reference to FIG. 2 that includes additional or alternative functionality. As shown in FIG. 5, the DCRS 500 can include an event extraction system 502.

In several embodiments, the event extraction system 502 can be configured to extract structured representations, or events, from the cleaned, autopunctuated, and co-reference resolved text strings of speaker turns generated by a speaker turn preprocessing system (e.g., the coreference-resolved speaker turns 426 generated by the speaker turn preprocessing system 402 shown in FIG. 4). An event can describe a customer's reason for their call and any context surrounding that call reason and can consist of a constituent phrase that is succinct enough to capture as much of the core semantics of the original text as possible while also being human-readable. In several embodiments, each event extracted by the event extraction system 502 can include a constituent phrase having a subject, a verb, and an object. For example, the main constituent phrase of interest can be a subject>verb>object phrase such as "customer wants to make payment."

In one example, the event extraction system 502 can utilize a semantic role labeling (SRL) model 510 to perform vectorization 512 and a semantic role result to all text in speaker turn by passing it through an SRL parser trained, using a deep highway LSTM architecture, to generate SRL-parsed speaker turns 516 (e.g., extracted turns with assigned SRL parse argument types). The deep highway LSTM 514 can be, for example, a deep highway LSTM as described in, for example, He, L., et al, "Deep Semantic Role Labeling: What Works and What's Next," Proceedings of the 55th Annual Meeting of the Association for Computational Linguistics, Volume 1: Long Papers, July 2017, pp. 473-483, the entirety of which is hereby incorporated by reference. The event extraction system 502 can then utilize an SRL parse post-processing model 520 to post-process the SRL-parsed speaker turns 516 using string operations 522 (e.g., handcrafted rules) to generate SRL parse post-processed output 524 indicative of the extracted events. Subsequently, the event extraction system 502 can transmit the SRL parse post-processed output 524 indicative of the extracted events to both a cluster generation system (e.g., cluster generation system 602 shown in FIG. 6) and a cluster assignment system (e.g., cluster assignment system 702 shown in FIG. 7).

Figure 6:
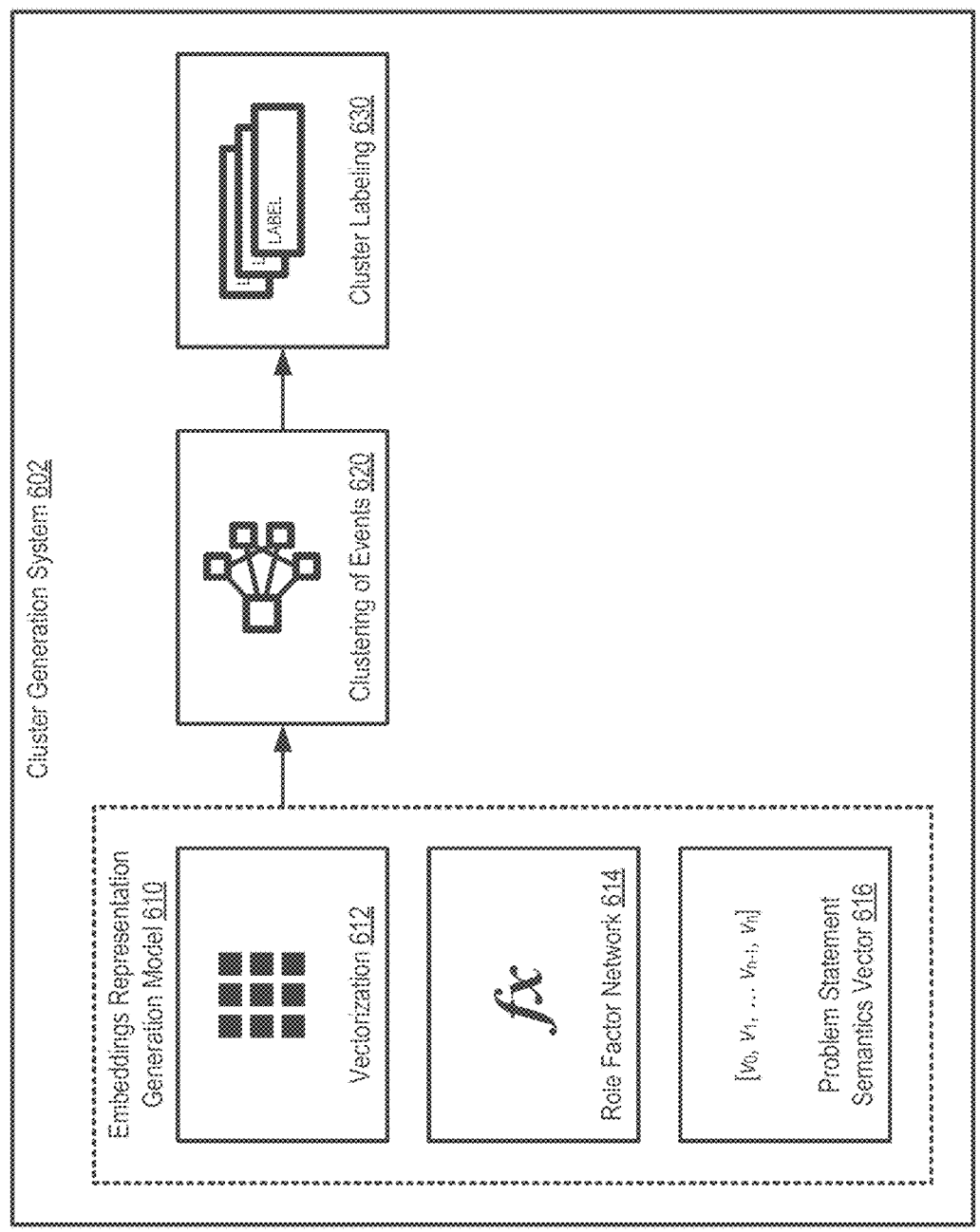
FIG. 6 illustrates another portion of an example DCRS according to some embodiments.

FIG. 6 is a block diagram of an example portion of a DCRS 600 for automatically generating fine-grained call reasons from customer service call transcripts according to some embodiments. In several embodiments, the DCRS 600 may be an extended configuration of the DCRS 130 described with reference to FIG. 1 and/or the DCRS 200 described with reference to FIG. 2 that includes additional or alternative functionality. As shown in FIG. 6, the DCRS 600 can include a cluster generation system 602 for generating clusters of events across a large corpus (e.g., by creating features for event tuples, which are then used to cluster similar events using a role factor network).

In several embodiments, the cluster generation system 602 can be configured to identify clusters of events based on the events extracted by an event extraction system (e.g., the SRL parse post-processed output 524 generated by the event extraction system 502 shown in FIG. 5). In creating the feature representations used to cluster similar events, the cluster generation system 602 can be guided by the intuition that the interactions among the arguments in the event, rather than the arguments themselves, can be encoded in the representation. For example, the cluster generation system 602 can receive as input the following two events: (i) "{[SUBJ: I] [VERB: want to report] [OBJ: an iTunes charge] }"; and (ii) "{[SUBJ: I] [VERB: want to cancel] [OBJ: an AppleTV+charge]}." Although there is high lexical (e.g., "I," "want to," "an," "charge") and semantic (e.g., "iTunes," "AppleTV+"=Apple services) overlap in these two events, they describe very different scenarios. The first event reports a fraudulent charge, while the second involves a request to cancel a possibly mistaken charge. The cluster generation system 602 can encode these subtle differences using feature representations for these events.

In one example, the cluster generation system 602 can utilize an embeddings representation generation model 610 to perform vectorization 612 and generate, using a role factor network 614, event embeddings that capture both distributional information associated with events as well as the interactions among the arguments within those events. The role factor network 614 can be, for example, a role factor network as described in, for example, Weber et al. (cited above), the entirety of which is hereby incorporated by reference. The event embeddings can enable the cluster generation system 602 to identify clusters of situationally similar events independent of lexical overlap. The cluster generation system 602 can then utilize the embeddings representation generation model 610 to generate a problem-statement semantics vector 616 indicative of the event embeddings (e.g., the semantics of the problem statement represented as a dense n-dimensional vector).

Continuing the example, the cluster generation system 602 can then perform clustering of events 620 based on the problem-statement semantics vector 616 indicative of the event embeddings. After clustering all events across the corpus, the cluster generation system 602 can perform cluster labeling 630 to provide a label to each cluster using a graph-based sentence compression algorithm that generalizes the lexical variation found in that cluster's events. The graph-based sentence compression algorithm can be, for example, a graph-based sentence compression algorithm as described in, for example, Filippova, K., "Multi-Sentence Compression: Finding Shortest Paths in Word Graphs," Association for Computational Linguistics, Proceedings of the 23rd International Conference on Computational Linguistics, August 2010, pp. 322-330, the entirety of which is hereby incorporated by reference. Subsequently, the cluster generation system 602 can store the labeled clusters of events in a cluster database (e.g., cluster database 210 shown in FIG. 2).

Figure 7:
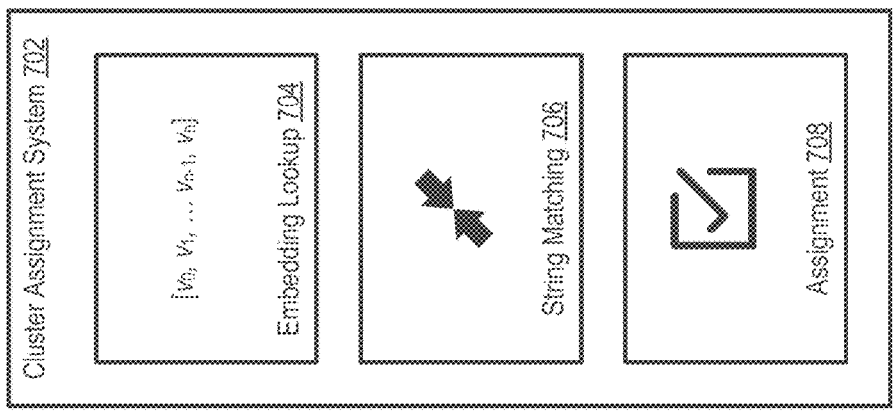
FIG. 7 illustrates another portion of an example DCRS according to some embodiments.

FIG. 7 is a block diagram of an example portion of a DCRS 700 for automatically generating fine-grained call reasons from customer service call transcripts according to some embodiments. In several embodiments, the DCRS 700 may be an extended configuration of the DCRS 130 described with reference to FIG. 1 and/or the DCRS 200 described with reference to FIG. 2 that includes additional or alternative functionality. As shown in FIG. 7, DCRS 700 can include a cluster assignment system 702.

In several embodiments, the cluster assignment system 702 can be configured to perform embedding lookup 704, string matching 706, and assignment 708 to assign each event extracted by an event extraction system (e.g., the SRL parse post-processed output 524 generated by the event extraction system 502 shown in FIG. 5) to a respective labeled cluster of events stored in a cluster database (e.g., a cache of labeled clusters generated by the cluster generation system 602 shown in FIG. 6 and stored in the cluster database 210 shown in FIG. 2). For example, the cluster assignment system 702 can use both the text identified by a problem-statement classification model (e.g., the extracted speaker turns 316 generated by the transcript processing and classification system 302 using the problem-statement classification model 310 shown in FIG. 3) and, optionally, the events extracted from this text (e.g., the SRL parse post-processed output 524 generated by the event extraction system 502 using the SRL parse post-processing model 520 shown in FIG. 5) to map these strings to one or more of the stored clusters. The cluster assignment system 702 can use a combination of string matching 706 (e.g., fuzzy string matching) and vector-based similarity metrics. String matching 706 can use, for example, an edit distance metric such as Levenshtein distance to measure differences in character sequences between a problem statement and clustered events. Vector-based similarity metrics can perform embedding lookup 704 against a set of pretrained embeddings which can then be used to calculate a similarity score relative to the cluster embeddings generated by a cluster generation system (e.g., the problem-statement semantics vector 616 generated by the cluster generation system using the embeddings representation generation model 610 shown in FIG. 6).

Methods of Operation

Figure 8:
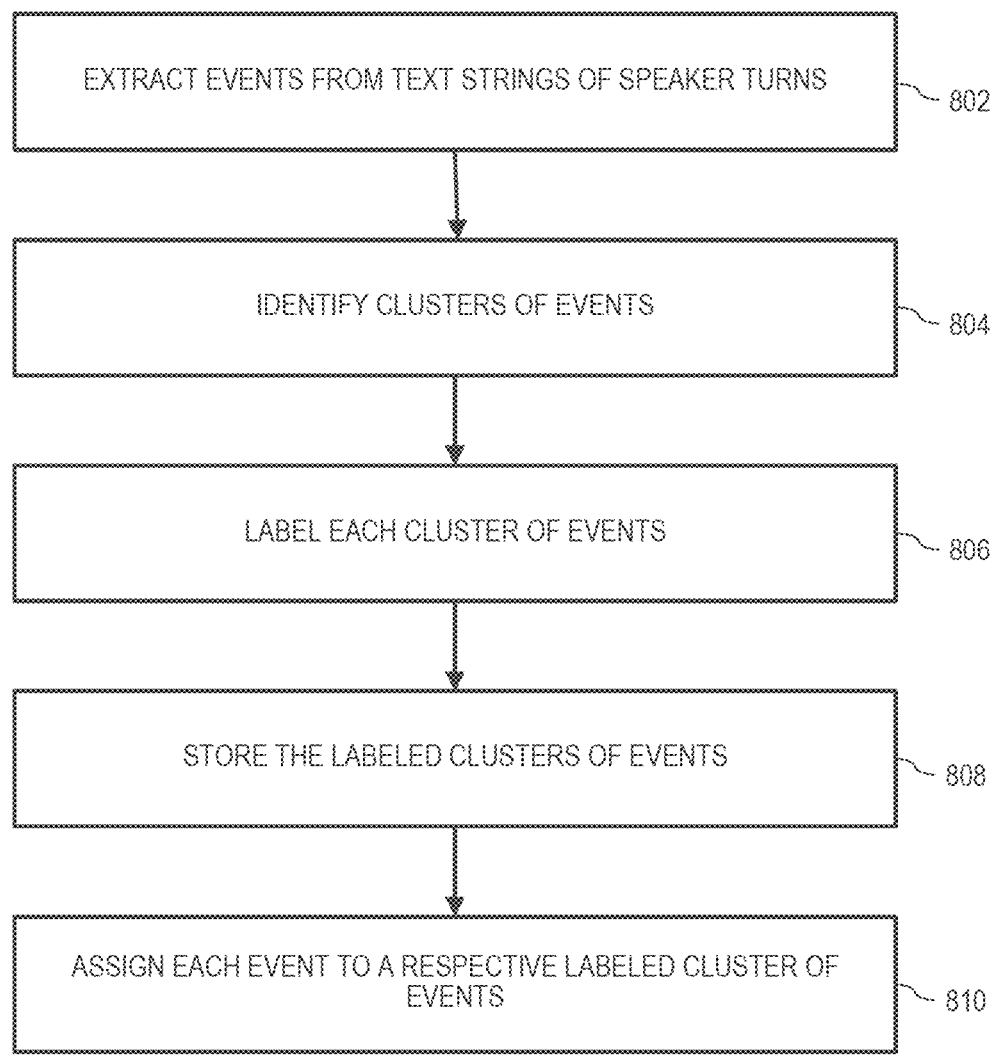
FIG. 8 is an example process flow for automatically generating fine-grained call reasons from customer service call transcripts according to some embodiments.

FIG. 8 is an example method 800 of operating the system 100, DCRS 200, DCRS 300, DCRS 400, DCRS 500, DCRS 600, DCRS 700, architecture 900, or a combination thereof, to provide for automatically generating fine-grained call reasons from customer service call transcripts according to some embodiments. In several embodiments, the operations of method 800 can be performed, for example, by the functional units or devices described with reference to the system 100, DCRS 200, DCRS 300, DCRS 400, DCRS 500, DCRS 600, DCRS 700, architecture 900, or a combination thereof. For the sake of brevity (and not limitation), the operations of method 800 shall be described with reference to the DCRS 200 shown in FIG. 2. However, the operations of method 800 are not limited to those example embodiments. For example, additionally or alternatively, one or more operations of method 800 can be performed by the DCRS 130 shown in FIG. 1, the DCRS 300 shown in FIG. 3, the DCRS 400 shown in FIG. 4, the DCRS 500 shown in FIG. 5, the DCRS 600 shown in FIG. 6, the DCRS 700 shown in FIG. 7, any other suitable component or structure, or any combination thereof.

In several embodiments, in operation 802, the event extraction system 206 extracts, using an NLP technique, a set of events from a set of text strings of speaker turns. In some embodiments, each event in the set of events can include a constituent phrase having a subject, a verb, and an object.

In one example, in operation 802, the event extraction system 206 can feed the set of text strings of speaker turns to a logistic regression classifier trained to generate a set of probability values that includes a respective probability value for each speaker turn in the set of text strings of speaker turns. Each probability value in the set of probability values can indicate a likelihood that a respective speaker turn contains natural language expressing a respective call reason. The event extraction system 206 can then extract each event in the set of events from a respective speaker turn in a respective text string of speaker turns having a highest-ranking respective probability value.

In another example, in operation 802, the event extraction system 206 can feed the set of text strings of speaker turns to a semantic role labeling parser trained, using a deep highway LSTM neural network, to assign a respective semantic role result to each predicate in each sentence found in each speaker turn in the set of text strings of speaker turns. The event extraction system 206 can then extract the set of events based on the respective semantic role results assigned to each speaker turn in the set of text strings of speaker turns.

In several embodiments, in operation 804, the cluster generation system 208 identifies a set of clusters of events based on the set of events. For example, in operation 804, the cluster generation system 208 can feed the set of events to a role factor network trained to generate a set of event embeddings that capture (i) distributional information associated with the set of events and (ii) interactions between arguments within the set of events. The cluster generation system 208 can then identify the set of clusters of events based on the set of event embeddings.

In several embodiments, in operation 806, the cluster generation system 208 labels each cluster of events in the set of clusters of events to generate a set of labeled clusters of events. For example, in operation 804, the cluster generation system 208 can label each cluster of events using a graph-based sentence compression algorithm that generalizes lexical variations in the events of each cluster of events.

In several embodiments, in operation 808, the cluster generation system 208 stores the labeled clusters of events in the cluster database 210.

In several embodiments, in operation 810, the cluster assignment system 212 assigns each event in the set of events to a respective labeled cluster of events in the set of labeled clusters of events.

Components of the System

Figure 9:
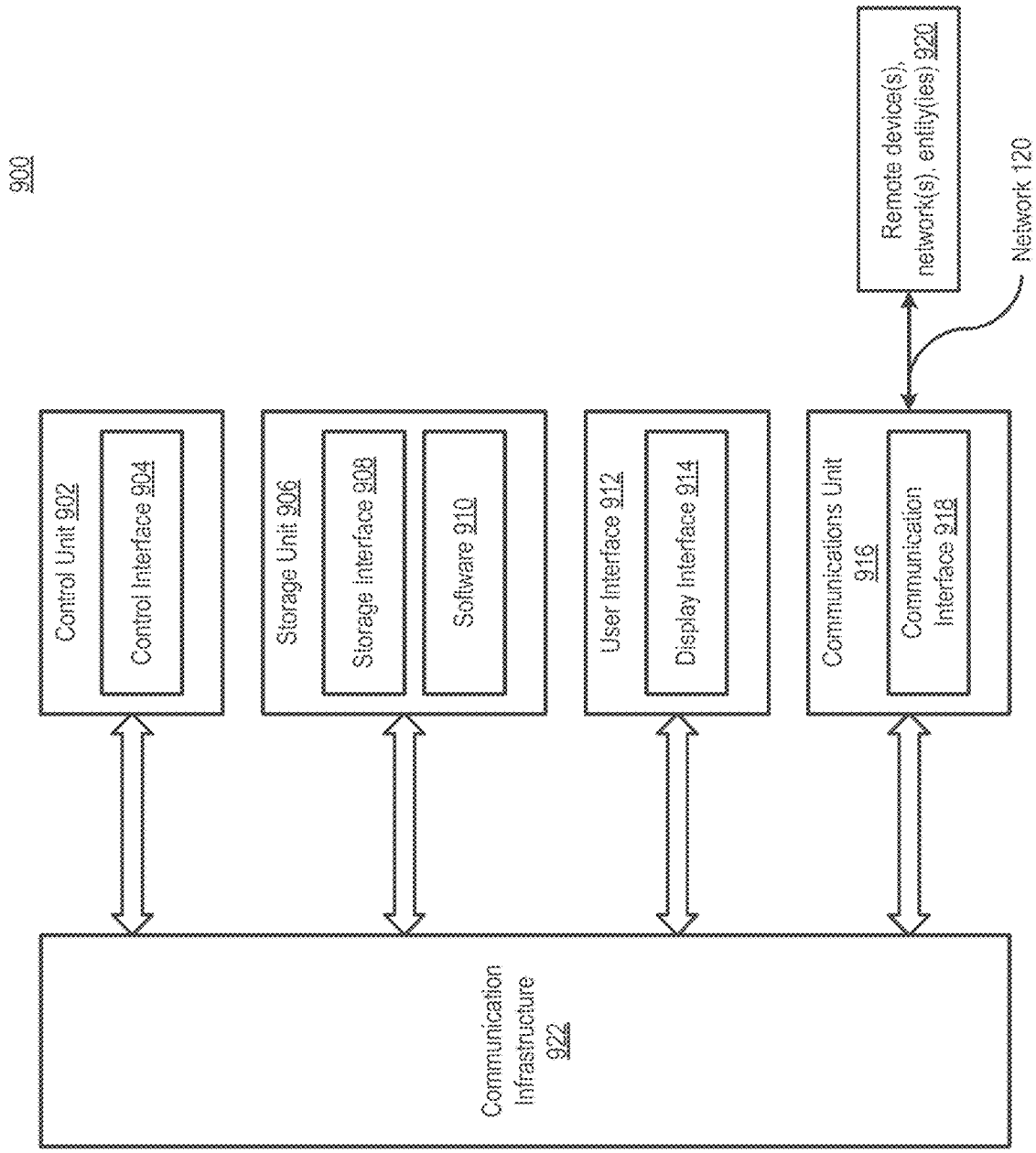
FIG. 9 is an example architecture of components implementing an example system for automatically generating fine-grained call reasons from customer service call transcripts according to some embodiments.

FIG. 9 is an example architecture 900 of components implementing the system 100, DCRS 200, DCRS 300, DCRS 400, DCRS 500, DCRS 600, DCRS 700, the DCRS described below with reference to the "personal finance" use case, or a combination thereof, according to some embodiments. The components may be implemented by any of the devices described with reference to: the system 100, such as the client device 110, the client device 160, the call server 150, the DCRS 130, or the call reasons database 140; the DCRS 200, such as the transcript processing and classification system 202, the speaker turn preprocessing system 204, an event extraction system 206, the cluster generation system 208, the cluster database 210, or the cluster assignment system 212; the DCRS 300, such as the transcript processing and classification system 302; the DCRS 400, such as the speaker turn preprocessing system 402; the DCRS 500, such as the event extraction system 502; the DCRS 600, such as the cluster generation system 602; the DCRS 700, such as the cluster assignment system 702; the DCRS described below with reference to the "personal finance" use case, including FIGS. 10A, 10B, 10C, and 10D, and Tables 1 and 2; any other device, component, or structure disclosed herein; or any combination thereof.

In several embodiments, the components may include a control unit 902, a storage unit 906, a communication unit 916, and a user interface 912. The control unit 902 may include a control interface 904. The control unit 902 may execute a software 910 to provide some or all of the machine intelligence described with reference to the system 100, DCRS 200, DCRS 300, DCRS 400, DCRS 500, DCRS 600, DCRS 700, architecture 900, or a combination thereof.

The control unit 902 may be implemented in a number of different ways. For example, the control unit 902 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 904 may be used for communication between the control unit 902 and other functional units or devices of the system 100, DCRS 200, DCRS 300, DCRS 400, DCRS 500, DCRS 600, DCRS 700, architecture 900, or a combination thereof. The control interface 904 may also be used for communication that is external to the functional units or devices of the system 100, DCRS 200, DCRS 300, DCRS 400, DCRS 500, DCRS 600, DCRS 700, remote devices 920, or a combination thereof. The control interface 904 may receive information from, or transmit information to, the functional units or devices of the system 100, DCRS 200, DCRS 300, DCRS 400, DCRS 500, DCRS 600, DCRS 700, remote devices 920, or a combination thereof. The remote devices 920 refer to units or devices external to the system 100, DCRS 200, DCRS 300, DCRS 400, DCRS 500, DCRS 600, or DCRS 700.

The control interface 904 may be implemented in different ways and may include different implementations depending on which functional units or devices of the system 100, DCRS 200, DCRS 300, DCRS 400, DCRS 500, DCRS 600, DCRS 700, or the remote devices 920 are being interfaced with the control unit 902. For example, the control interface 904 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 904 may be connected to a communication infrastructure 922, such as a bus, to interface with the functional units or devices of the system 100, DCRS 200, DCRS 300, DCRS 400, DCRS 500, DCRS 600, DCRS 700, the remote devices 920, or a combination thereof.

The storage unit 906 may store the software 910. For illustrative purposes, the storage unit 906 is shown as a single element, although it is understood that the storage unit 906 may be a distribution of storage elements. Also for illustrative purposes, the storage unit 906 is shown as a single hierarchy storage system, although it is understood that the storage unit 906 may be in a different configuration. For example, the storage unit 906 may be formed with different storage technologies forming a memory hierarchical system including different levels of caching, main memory, rotating media, or off-line storage. The storage unit 906 may be a volatile memory, a nonvolatile memory, an internal memory, an external memory, or a combination thereof. For example, the storage unit 906 may be a nonvolatile storage such as nonvolatile random access memory (NVRAM), Flash memory, disk storage, or a volatile storage such as static random access memory (SRAM) or dynamic random access memory (DRAM).

The storage unit 906 may include a storage interface 908. The storage interface 908 may be used for communication between the storage unit 906 and other functional units or devices of the system 100, DCRS 200, DCRS 300, DCRS 400, DCRS 500, DCRS 600, DCRS 700, or a combination thereof. The storage interface 908 may also be used for communication that is external to the system 100, DCRS 200, DCRS 300, DCRS 400, DCRS 500, DCRS 600, DCRS 700, or a combination thereof. The storage interface 908 may receive information from, or transmit information to, the other functional units or devices of the system 100, DCRS 200, DCRS 300, DCRS 400, DCRS 500, DCRS 600, DCRS 700, the remote devices 920, or a combination thereof. The storage interface 908 may include different implementations depending on which functional units or devices of the system 100, DCRS 200, DCRS 300, DCRS 400, DCRS 500, DCRS 600, DCRS 700, or the remote devices 920 are being interfaced with the storage unit 906. The storage interface 908 may be implemented with technologies and techniques similar to the implementation of the control interface 904.

The communication unit 916 may enable communication to devices, components, modules, or units of the system 100, DCRS 200, DCRS 300, DCRS 400, DCRS 500, DCRS 600, DCRS 700, the remote devices 920, or a combination thereof. For example, the communication unit 916 may permit the system 100 to communicate between the client device 110, the client device 160, the call server 150, the DCRS 130, the call reasons database 140, or a combination thereof. In another example, the communication unit 916 may permit the DCRS 200 to communicate between the transcript processing and classification system 202, the speaker turn preprocessing system 204, an event extraction system 206, the cluster generation system 208, the cluster database 210, the cluster assignment system 212, or a combination thereof. The communication unit 916 may further permit the devices of the system 100, DCRS 200, DCRS 300, DCRS 400, DCRS 500, DCRS 600, DCRS 700, or a combination thereof, to communicate with the remote devices 920 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 120. Cable, Ethernet, digital subscriber line (DSL), fiber optic lines, fiber to the home (FTTH), and plain old telephone service (POTS) are examples of wired communication that may be included in the network 120. Further, the network 120 may traverse a number of network topologies and distances. For example, the network 120 may include direct connection, personal area network (PAN), local area network (LAN), metropolitan area network (MAN), wide area network (WAN), or a combination thereof.

The communication unit 916 may also function as a communication hub allowing the system 100, DCRS 200, DCRS 300, DCRS 400, DCRS 500, DCRS 600, DCRS 700, or a combination thereof, to function as part of the network 120 and not be limited to be an end point or terminal unit to the network 120. The communication unit 916 may include active and passive components, such as microelectronics or an antenna, for interaction with the network 120.

The communication unit 916 may include a communication interface 918. The communication interface 918 may be used for communication between the communication unit 916 and other functional units or devices of the system 100, DCRS 200, DCRS 300, DCRS 400, DCRS 500, DCRS 600, DCRS 700, the remote devices 920, or a combination thereof. The communication interface 918 may receive information from, or transmit information to, the other functional units or devices of the system 100, DCRS 200, DCRS 300, DCRS 400, DCRS 500, DCRS 600, DCRS 700, the remote devices 920, or a combination thereof. The communication interface 918 may include different implementations depending on which functional units or devices are being interfaced with the communication unit 916. The communication interface 918 may be implemented with technologies and techniques similar to the implementation of the control interface 904.

The user interface 912 may present information generated by the system 100, DCRS 200, DCRS 300, DCRS 400, DCRS 500, DCRS 600, DCRS 700, or a combination thereof. In several embodiments, the user interface 912 allows a user to interface with the devices of the system 100, DCRS 200, DCRS 300, DCRS 400, DCRS 500, DCRS 600, DCRS 700, the remote devices 920, or a combination thereof. The user interface 912 may include an input device and an output device. Examples of the input device of the user interface 912 may include a keypad, buttons, switches, touchpads, soft-keys, a keyboard, a mouse, or any combination thereof to provide data and communication inputs. Examples of the output device may include a display interface 914. The control unit 902 may operate the user interface 912 to present information generated by the system 100, DCRS 200, DCRS 300, DCRS 400, DCRS 500, DCRS 600, DCRS 700, or a combination thereof. The control unit 902 may also execute the software 910 to present information generated by the system 100, DCRS 200, DCRS 300, DCRS 400, DCRS 500, DCRS 600, DCRS 700, or a combination thereof, or to control other functional units of the system 100, DCRS 200, DCRS 300, DCRS 400, DCRS 500, DCRS 600, DCRS 700, or a combination thereof. The display interface 914 may be any graphical user interface such as a display, a projector, a video screen, or any combination thereof "Personal Finance" Use Case Having described some example embodiments in general terms, the following example embodiments are provided to further illustrate use cases of some example embodiments. In some instances, the following example embodiments provide examples of how the DCRS disclosed herein may automatically generate fine-grained call reasons from customer service call transcripts.

"Personal finance" is an illustrative example use case wherein the DCRS disclosed herein automatically generating fine-grained call reasons from customer service call transcripts by detecting themes in publicly-available corpus of personal finance questions on the Stack Exchange® website https://money.stackexchange.com, labeled by users with topic tags (also referred to in this use case as the "dataset" or "test set"). The "personal finance" use case presents a partial replication of a portion of the DCRS disclosed herein, specifically, the text encoding and clustering steps, using a publicly available corpus of StackExchange personal finance questions.

Call centers receive millions of calls annually, with much of the information in these calls unavailable to analysts interested in tracking new and emerging call center trends. To capture the occurrence of multiple themes in a single question in the publicly-available corpus of StackExchange personal finance questions, the DCRS encoded and clustered at the sentence-level, rather than at the question-level, and presented a comparison of example sentence encoding models, including the sentence bidirectional encoder representations from transformers (Sentence-BERT or SBERT) family of sentence encoders. The DCRS framed its evaluation as a multiclass classification task and showed that a simple combination of the original sentence text, universal sentence encoder (USE), and KMeans outperformed more sophisticated techniques that involve semantic parsing, SBERT-family models, and the hierarchical density-based spatial clustering of applications with noise (HDBSCAN) clustering algorithm. The highest performing system achieved a micro-averaged F1 (micro-F1) score of 0.46 for this task, and the DCRS showed that the resulting clusters, even when slightly noisy, contained sentences that were topically consistent with the label associated with the cluster.

Call centers often lie at the heart of customer-bank interactions, with the typical major bank call center receiving millions of calls annually from customers. Call topics range from relatively simple credit-card reissue requests, which trigger an associated business process, to more complex topics such as hardship-based annual percentage rate (APR)-reduction requests. The DCRS utilizes an automatic speech recognition (ASR) system to transcribe these calls, making them available as searchable transcripts to company-internal business analysts. Alongside search, business analysts increasingly rely on the unsupervised extraction of key themes trending in call centers. This information can be used to drive business decisions and agent allocation, as well as determine agent training opportunities.

The business value of theme detection for call center data has motivated its inclusion in natural language processing (NLP) tool benches for call center transcript analyses. The DCRS tool for theme detection employs a pipeline approach to this task. In the first step, a small number of customer utterances likely to contain mentions of the customer's reason for calling, as determined by simple heuristics, are pulled from the transcript. These utterances are referred to as the customer problem statement (CPS). The CPSs are then passed to the second step for encoding and clustering. In the second step, the sentence-segmented CPSs are encoded and the resulting vector-based representations are clustered into thematically distinct groupings. In this example, the DCRS encodes and clusters sentences or reduced representations of sentences in the CPSs, rather than entire transcripts, across an entire corpus of calls, which allows the DCRS to capture the occurrence of multiple themes in a single call. The DCRS then labels these clusters by generalizing the lexical variation found in the clustered sentences into a single, human-interpretable string. These cluster labels are the "themes" present in a given collection of call transcripts. For example, in the case of a cluster containing sentences in which customers, during the initial stages of the COVID crisis, request an APR reduction, a typical theme might be "request_reduce_APR_because_of_Covid_hardship."

As discussed in further detail below, this "personal finance" use case presents the results of experiments that compare encoding and clustering techniques for the second step in the DCRS's theme detection pipeline. All reported experiments were performed using publicly available data of the same domain and roughly the same register as the CPSs in a bank's call center data: questions posted to the personal finance site of StackExchange. The results of these experiments show a combination of USE and KMeans out-performing all other techniques.

Examples of work specifically targeting sentence and substring encoding and clustering will now be discussed. While there has been some work comparing embedding techniques for finance-domain text, most related work reporting the results of experimental comparisons of encoding/clustering combinations of short text involve non-finance-domain text. One example technique evaluated several embedding- and transformer-based models in combination with different clustering and distance metrics on newswire and scientific texts and reported that a simple skip-gram model, operating over character n-grams, along with agglomerative clustering, provides the highest-quality result, where cluster quality was measured using Adjusted Mutual Information. Another example tracked COVID-19-related tweets using USE-based representations of tweets and KMeans as the clustering algorithm; evaluation was performed on a manually annotated set of tweets, with the described approach outperforming term frequency/inverse document frequency (TF-IDF)-based and latent Dirichlet allocation (LDA)-based baselines. In the area of event detection, the approach to detecting weather-related events across a large number of tweets may be closest in spirit to the approach described in this use case. As with the DCRS experiments described below with semantic role-labeling (SRL)-based representations, these weather-related event detection techniques first reduce tweets to noun-verb pairs called "sub-events" and then evaluate several encoding and clustering strategies for these sub-events. However, unlike the unsupervised approach described herein, one such weather-related event detection technique used an ontology as a source of distance supervision, thereby restricting their sub-events to sub-events in the scope of the ontology. Further, their corpus consisted of tweets dealing with emerging disasters, a very different domain and register from that of bank call centers. Yet another example, evaluated several transformer-based encoding models as part of a student essay answer clustering task and reported significant differences in the performance of these encoding models relative to the subject-matter of a given essay.

The choice of string representation, encoding models, and choice of clustering evaluation metric used in the DCRS experiments will now be described. The first of these tasks related to string representation, where the DCRS evaluated the benefit of preprocessing the sentences(s) in the question text in such a way that potentially irrelevant information was filtered out and the core semantics of the sentence were preserved. The DCRS experimented with pre- and post-processed predicate-argument tuples of the sentence(s) extracted from the StackExchange questions. The DCRS obtained these tuples using a BERT-based SRL model (e.g., AllenNLP by the Allen Institute for AI (AI2)) and utilized the following pre- and post-processing steps:

a. The DCRS sentence-segmented all questions using a natural language toolkit (NLTK).

b. The DCRS replaced all non-personal pronouns with their single- or multi-word antecedents. For example, given the sentences "I'm calling about my card" and "it's not working," the DCRS rewrote the latter sentence as "My card not working" by resolving the "my card-it" coreference pair using a neural coreference model. This allowed the DCRS to generalize many coreferring arguments in the parses.

c. The DCRS discarded all SRL parses without nominal material in their subject or object arguments.

d. Constructions with to-infinitives, when serving as complements of "need" or "want," such as "I need to know my password," are frequent in call center data. The DCRS utilized the SRL parser to parse these constructions as two, contradictory parses: ("I," "need," "my password") and ("I," "know," "my password"). The DCRS then used heuristics to identify and discard the latter factually ambiguous parse ("I," "know," "my password"), keeping the former phrase ("I," "need," "my password").

e. The DCRS deleted all arguments with adverbial or adjectival heads, such as the ARGM-ADV argument "totally," from the parse.

f. The DCRS lemmatized all argument text (e.g., using the spaCy lemmatization API).

Thus, given the sentence "I live in California, while my parents' estate was in Pennsylvania.," the DCRS utilizes SRL parsing and pre- and post-processing outputs the parses ("i," "live," "in California") and ("parent estate," "be," in "pennsylvania"), where all SRL tag information has been stripped.

The second of these tasks related to encodings, where, after segmenting the question text into sentences or SRL parses, the DCRS fed each string into a pre-trained encoder. The DCRS performed experiments involving three types of encodings, each representing a different approach to encoding short text: USE, SBERT-family models, and, as a baseline, TF-IDF weighted n-grams.

As the DCRS's first encoding type, the DCRS used the transformer-based encoder variant of USE, as implemented in TensorFlow, which created all-purpose sentence representations in two stages. First, the DCRS drew fixed length representations of sentences from the encoding layer of the original transformer architecture, which captured both word ordering and context. Second, to make these representations as general as possible, the DCRS used a multi-task learning architecture to learn embeddings for multiple sentence-level tasks, such as inference and conversational input-response prediction.

As the DCRS's second encoding type, the DCRS used SBERT-family models. SBERT addresses BERT's cumbersome method of determining sentence similarity, a pairwise method with a prohibitively costly time complexity. SBERT, by contrast, pools the output of BERT's token embeddings as part of a siamese network architecture and fine-tunes on the Stanford Natural Language Inference (SNLI) and multi-genre natural language inference (MultiNLI) corpora. The resulting, fixed-length sentence embeddings can be compared using traditional semantic similarity metrics such as cosine similarity. As with the original BERT model, better trained and smaller SBERT models have been developed. These models, collectively called "SBERT-family models" herein, are trained using BERT-family models such as RoBERTa, a variant of BERT optimized with longer training and more sophisticated hyperparameter tuning, and Distil-RoBERTa, a lighter, faster version of RoBERTa, as drop-in replacements for BERT. In the experiments reported herein, the DCRS used three SBERT-family model implementations: STSB-BERT-base and STSB-RoBERTa-base, which were trained on SNLI and MultiNLI and then fine-tuned on a sentence similarity task; and Paraphrase-DistilRoberta-base, which was trained on millions of paraphrase examples.

As the DCRS's third encoding type, the DCRS used vectors of TF-IDF-weighted n-grams as a baseline.

The third of these tasks related to clustering, where, after obtaining the sentence-or-SRL-parse-level vectors, the DCRS ran a clustering algorithm to aggregate semantically similar vectors. The DCRS experimented with two clustering approaches. First, the DCRS used KMeans clustering, which learned to partition the embedding vector space into K-many regions, to which each sentence/SRL-parse embedding was assigned. Second, the DCRS used HDBSCAN, which learned to identify regions in embedding space with consistent densities of embedding vectors. The DCRS used HDBSCAN to accomplish this by first organizing embeddings into a distance weighted graph and then found a corresponding minimum spanning tree to obtain a hierarchy of connected components comprising a cluster.

After encoding and clustering the sentences in the training set, the DCRS treated the resulting clusters as a supervised classification model and evaluated the accuracy of the model on the test set using a custom evaluation procedure.

The DCRS defined $N_{ji}$ as the number of training sentences in cluster i that belong to tag j and $N_i = \Sigma_j = 1$ $N_{ji}$, as the total number of sentences in cluster i. The DCRS further defined $p_{ji} = N_{ji}/N_i$ as the distribution over tags for cluster i. So, given a 10 sentence cluster i with 4 sentences tagged "mortgage" and 6 sentences tagged "investing," the distribution $p_i$, was 0.4 for "mortgage" and 0.6 for "investing."

To generate a prediction for test question post $Q_j$, the DCRS first applied sentence tokenization, then for each sentence $S_j \in Q_j$, the DCRS found the nearest cluster i by calculating the cosine distance between the encoded sentence and the cluster centroids. The DCRS defined the resulting set of closest clusters as $U = \{i_1 \ldots i_K\}$, where K was the number of sentences $S_j$ in $Q_j$, and where each i in U had an associated distribution $p_{i,j}$. As shown in Equation 1, the DCRS used these distributions to calculate a final prediction for the question by calculating:

$$\arg(\max)_j \frac{1}{k} \sum_k p_{ij} \qquad (1)$$

Thus, if a particular question had two sentences, the first of which was associated with a training cluster with the tag distribution 0.4 ("mortgage") and 0.6 ("investing"), and the second of which was associated with a different training cluster with the tag distribution 0.3 ("credit-score") and 0.7 ("mortgage"), the DCRS's prediction for this question would be "mortgage" since Equation 1 would result in (0.4+0.7)/2=0.55 for "mortgage," which is higher than the similarly calculated scores for "investing" and "credit-score." Although sentences can originate from a question with more than one tag, this had no impact on the DCRS's tag-specific distribution calculation.

The datasets utilized by the DCRS will now be described. The DCRS's main goal in dataset selection was to replicate, as much as possible, the domain and register of the CPS's used in banking call center datasets. Accordingly, the DCRS selected as its experimental dataset the personal finance site of StackExchange, with its publicly available user-generated questions, labeled with multiple topic tags. These questions closely resembled banking call center CPS's both in terms of domain (e.g., questions regarding APR reductions, credit-card fraud, balance transfers, etc.) and register (e.g., informal English, with a provided context followed by a question).

The DCRS collected a corpus of 32,648 personal finance StackExchange questions (all comments were excluded), timestamped between Oct. 6, 2009 and Feb. 27, 2021. To replicate the topics found in banking call center data, users manually identified 72 tags associated with at least 50 questions in the initial dataset. These 72 tags corresponded to common call reasons in banking call centers (e.g., call center call reasons are manually assigned at the call level by company-internal quality assurance monitors as part of an ongoing business process). The DCRS randomly split the questions using a 4:1 train-test split and removed training instances lacking one of the 72 manually-identified tags. Then, to simplify the experiment setting and to enable the use of multiclass classification metrics, the DCRS kept only the test questions with a single associated tag also found in the 72 manually-identified tags. The final training and test sets contained 26,118 and 2,216 questions, respectively. The DCRS checked for sampling bias when filtering out test documents with more than one tag and found that the difference in tag frequency rankings when including versus removing the multiple tagged questions was not statistically significant. The five most-frequent tags in the training and test data and a representative question associated with each tag are shown below in Table 1.

TABLE 1

The five most-frequent tags in the training and test data
and a representative question associated with each tag.

| Tag | Frequency | Example Question |
|---|---|---|
| investing | 0.088 | "Instead of buying actual gold, bringing it into your house, then worrying about it getting stolen. Is it possible to buy shares in gold?" |
| credit-card | 0.046 | "Is it illegal to open up a credit card account, hold it for a year, then cancel it and then turn around again and re open it and enjoy the 'first' year for free?" |
| mortgage | 0.043 | "In the UK, could a bank ask you to repay quicker a part of a mortgage (or a loan guaranteed with a property) because your risk profiles increases due to the value of property going below the loan-to-value?" |
| loans | 0.030 | "Planning on moving and getting our house ready to sell has been more expensive than I expected. I'd like to get this debt off of credit cards. What's the most cost effective way to do this?" |
| banking | 0.028 | "I am opening a bank account for my company and in the registration form they ask about the director of the company, who is me. After setting my details, they ask if I am a nominee. What is that supposed to be?" |

FIGS. 10A, 10B, 10C, and 10D illustrate example experimental results produced by an example DCRS for automatically generating fine-grained call reasons from customer service call transcripts in an illustrative example "personal finance" use case, according to some embodiments. The DCRS described with reference to FIGS. 10A, 10B, 10C, and 10D can be implemented utilizing the system 100, DCRS 200, DCRS 300, DCRS 400, DCRS 500, DCRS 600, DCRS 700, architecture 900, or a combination thereof, any other suitable component or structure, or any combination, subcombination, or portion thereof, according to some embodiments.

The DCRS's experimental results will now be described. The StackExchange questions in the dataset averaged 7.5 sentences each, with fully twenty percent (20%) of questions containing over 10 sentences. To ensure that the clustering task was tractable, the DCRS evaluated performance for only one to five sentences from a given StackExchange question. This means that the DCRS experimented with five separate datasets, each corresponding to the maximum number of sentences extracted from the StackExchange questions.

Figure 10A:
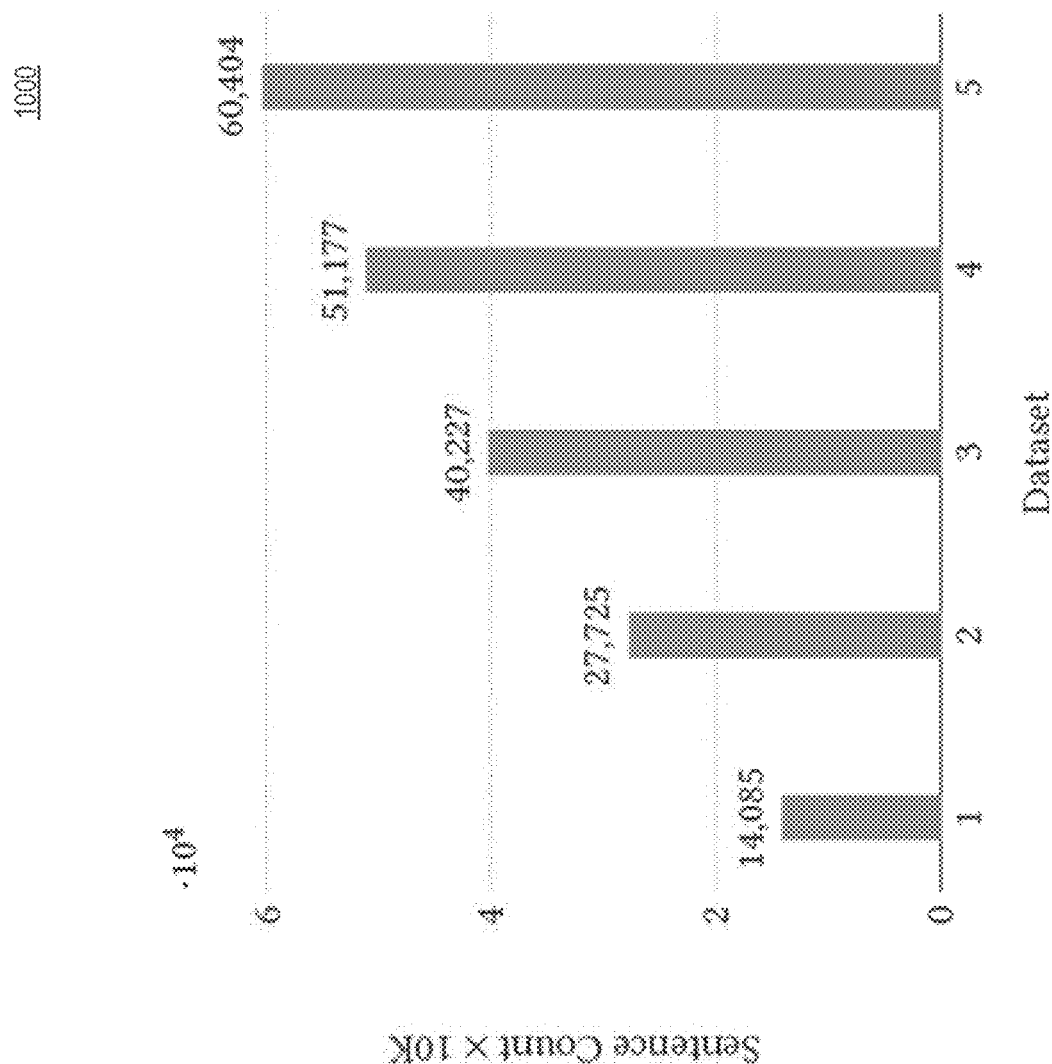
FIGS. 10A, 10B, 10C, and 10D illustrate example experimental results produced by an example DCRS according to some embodiments.

FIG. 10A includes a graph 1000 showing the total sentence count for each of the five datasets evaluated by the DCRS. The number ("1," "2," "3," "4," or "5") associated with each dataset indicates the maximum number of sentences extracted from the StackExchange questions.

The DCRS's experiment setup was as follows. For each string representation (full sentences versus SRL-parses) and for each encoding (USE, SBERT, or TF-IDF), the DCRS applied encoding and clustering to each of the five datasets. For the clustering step, the DCRS used two basic clustering techniques with tractable time complexities, KMeans and HDBSCAN. To determine k, the DCRS used a standard variant of the elbow method: For each k starting at 100 and at k=100 increments, the DCRS computed a distortion score, which was calculated as the sum of squared distances from each point in the cluster to its centroid. The DCRS performed this procedure multiple times with the most frequently occurring inflection point occurring at k=700. The DCRS applied a similar procedure to identify HDBSCAN's optimal minimum cluster size of 5 and minimum sampling size of 3. The DCRS then treated the resulting clusters as a classification model and evaluated the model on the 2,216 question test set described above using the evaluation procedure further described above.

The DCRS performed two sets of experiments. The first set of experiments was a preliminary set of experiments that evaluated the utility of comparing full sentence and SRL-parsed sentence string representations using only USE (described with reference to FIG. 10B). The second set of experiments compared all encoding and clustering techniques using only full sentences as the string representation (described with reference to FIG. 10C).

Figure 10B:
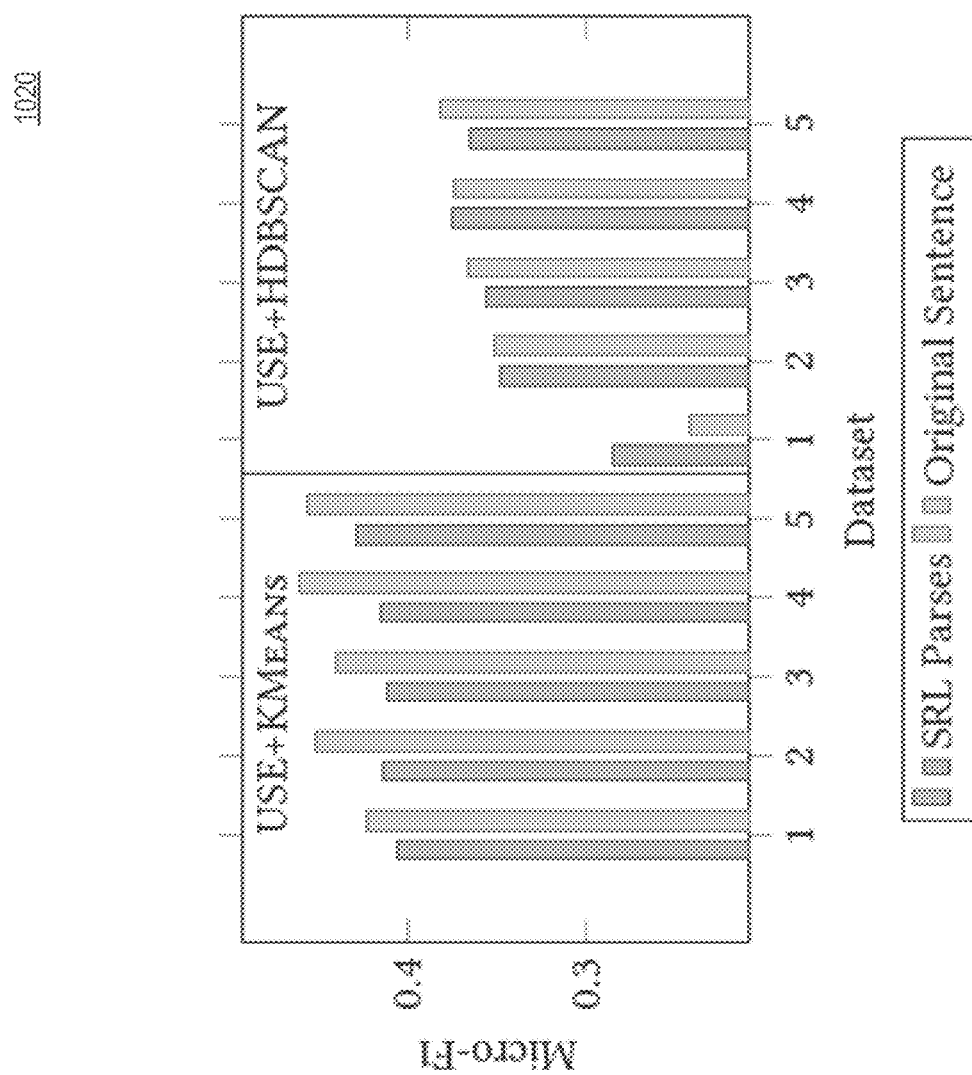

FIG. 10B includes a pair of graphs 1020 showing the results of the first, preliminary set of experiments performed by the DCRS in which the DCRS compared SRL-based string representations to full sentences using only USE encodings. Since SRL parsing and the associated pre- and post-processing had the potential to add significant overhead to DCRS's experimental pipeline, the goal of this first set of experiments was to determine the utility of generating SRL-based representations of the StackExchange sentences using only USE as an encoder. As is evident from FIG. 10B, for all datasets but dataset 1, the SRL-based representations underperformed relative to full sentences for both clustering techniques. Only in dataset 1, where only a single sentence was extracted from each question, did the DCRS see competitive performance using the SRL-based representation versus its full sentence counterpart. Additionally, for both KMeans and HDBSCAN, although the SRL-based encodings mostly underperformed relative to full sentences, micro-F 1 scores for these encodings did increase—albeit, non-monotonically—with each, larger dataset, suggesting that increased context helped performance, even for the SRL-based encodings. Given these results, the DCRS elected to use only full sentences in the final set of experiments.

Figure 10C:
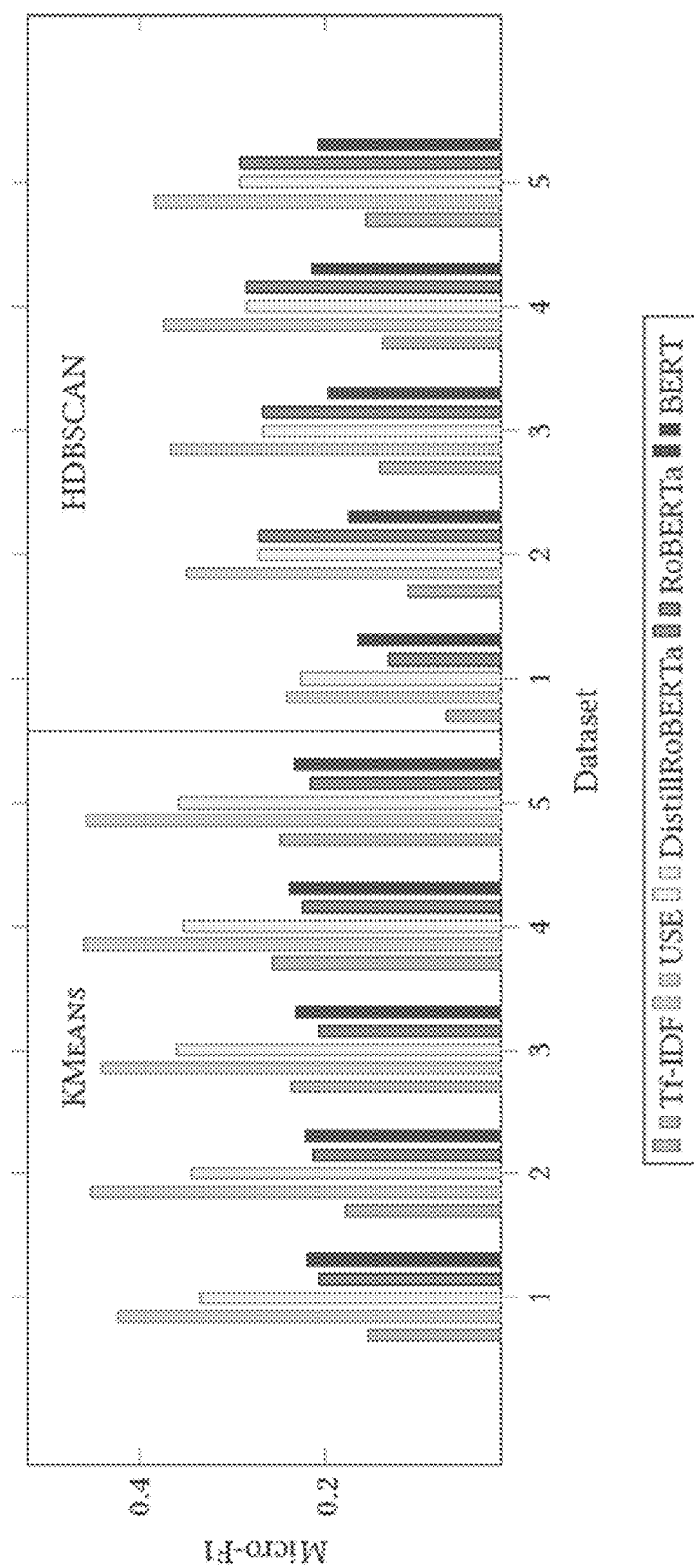

FIG. 10C includes a pair of graphs 1040 showing the results of the second, final set of experiments performed by the DCRS in which the DCRS compared USE and SBERT-family encodings, using full sentences. For these experiments, the DCRS experimented with all encoding types and clustering algorithms using only full-sentence string representations. The DCRS found that the highest-performing system was a combination of USE-based encodings of a maximum of four sentences from each question, and clustered using KMeans. This combination achieved a micro-F 1 score of 0.46 and beat all TF-IDF-encoding-based baselines and SBERT-family-encoding-based combinations. All KMeans-based combinations handily beat their HDBSCAN-based counterparts, often by large margins. While the empirically determined value for k used by KMeans was 700, HDBSCAN tended to choose values of k as low as 100, making it impossible for the HDBSCAN-based model to capture the wider variety of topics available to the KMeans-based model. One surprising result was the under-performance of the SBERT-family encodings relative to USE. It is possible that fine-tuning the SBERT-family models on the datasets would boost performance, though the very different corpora used to train USE versus SBERT could also be a contributor to the underperformance of these models.

The DCRS examined two clusters strongly associated with one of the higher-performing tags, "mortgage," to better evaluate the quality of the clusters returned by the strongest performing system. Examples of two "mortgage" clusters with high proportions of "mortgage" tags are shown below in Table 2.

TABLE 2

Examples of two "mortgage" clusters with high proportions of "mortgage" tags.

| Centrality Rank | Mostly Exclusively "Mortgage" Labeled | "Mortgage" Tagged with Others |
|---|---|---|
| 1 | "I can buy a house for $220,000 today and spend the same amount on the mortgage." | "Since most of the early mortgage payments on my 30-yr fixed rate loan go to interest rather than principal, how do I calculate how much I need to sell for to break even?" |
| 2 | "I would pay off the mortgage with it and then pay the loan off in place of the mortgage." | "Using a rough calculator, I'd be paying about $200/month toward the principal of the mortgage, which is more than the interest I'm accruing with my student loans." |
| 3 | "So my question: Is there a way to take multiple investment property mortgages and refinance them all into a single mortgage?" | "I assume the interest amount I'm currently paying for my 30-year mortgage is based on a 30-year amortization trajectory." |

As shown in Table 2, the first "mortgage" cluster in the column headed "Mostly Exclusively 'Mortgage' Labeled" contained sentences originating from training set questions tagged almost exclusively with the tag "mortgage," while the second, noisier "mortgage" cluster in the column "'Mortgage' Tagged with Others" contained a substantial number of sentences from training set questions tagged with non-"mortgage" tags in addition to the "mortgage" tag (e.g., a mix of "mortgage" and non-"mortgage"-related themes).

Table 2 further shows three rank-ordered sentences for each cluster, where rank is determined by their cosine distance to the cluster centroid. Generally, sentences in the "Mostly Exclusively 'Mortgage' Labeled" cluster tended to be the poster's original question and focused on whether or not to get a mortgage. In contrast, the noisier "'Mortgage' Tagged with Others" cluster tended to contain sentences dealing with the context around the poster's question (e.g., monthly payments or duration), rather than the question itself.

Figure 10D:
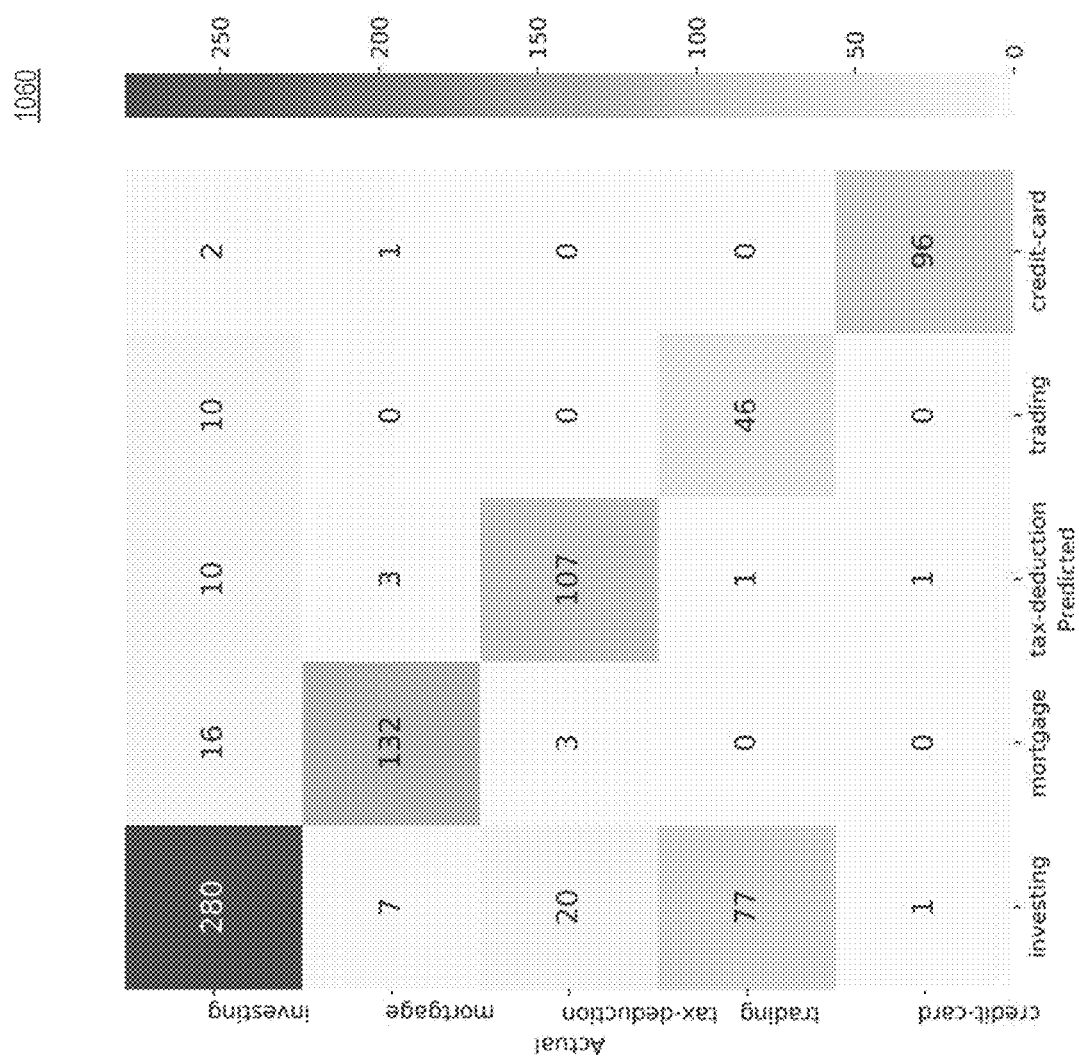

FIG. 10D includes a confusion matrix 1060 showing the top five most frequently labeled classes associated with the DCRS's error analysis of the strongest performing model, in which the DCRS found that cases of misclassification were often topically related to the misclassified target tag. As shown in FIG. 10D, the confusion matrix 1060 contains the top five most frequently occurring tags with predictions from the best performing system. For the target tag "trading," the DCRS observed that a large percentage of its confused cases involved the tag "investing" which is intuitive given that securities are an investment vehicle. Similarly, misclassifications of "tax deduction" also often involved the tag "investing," which is also intuitive given posters' common desire to learn about tax-deductible aspects of investments such as investment interest expenses. Another cause of relatively low classification performance appeared to be many false positive predictions of the dominant majority class "investing." Possible solutions to this for the DCRS's unsupervised approach may be to break up this ambiguous majority class into finer tags using other co-occurring tags or, in some aspects, investigating a score normalizing scheme to mitigate the majority impact.

In summary, the "personal finance" use case described herein presented the results of a series of experiments performed by the DCRS comparing various sentence encoding techniques in the context of a personal finance question clustering task, using publicly available personal finance questions as a testbed. These experiments replicated the results of the encoding and clustering stage of a DCRS that identifies themes in banking call center transcripts. Given the interest in capturing the potential occurrence of multiple themes in a single personal finance question, the DCRS clustered text at the sentence-level rather than at the question-level. The DCRS's first set of experiments compared string representations of these sentences (e.g., pre- and post-processed SRL parses versus the original sentences) and found that SRL-based representations underperformed relative to full sentences. The DCRS's second, fuller set of experiments compared SBERT-family and USE-based encoding types. Surprisingly, the DCRS found that SBERT, the state-of-the-art in sentence encoding, underperformed relative to USE, with the strongest performing system consisting of a combination of USE and KMeans. In some embodiments, the DCRS can further replicate the next stage of the theme detection system, the cluster labeling step. Additionally, given that the DCRS's motivating use-case is to track emerging call center trends, the DCRS can experiment with detecting emerging trends over a given time span in the StackExchange data.

CONCLUSION

The above detailed description and embodiments of the disclosed systems, apparatuses, articles of manufacture, methods, and computer program products are not intended to be exhaustive or to limit the system, apparatus, article of manufacture, method, and computer program product embodiments disclosed herein to the precise form disclosed above. While specific examples for the disclosed systems, apparatuses, articles of manufacture, methods, and computer program products are described above for illustrative purposes, various equivalent modifications are possible within the scope of the disclosed systems, apparatuses, articles of manufacture, methods, and computer program products, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods can be implemented in a variety of different ways. Also, while processes or methods may at times be shown as being performed in series, these processes or blocks may instead be performed or implemented in parallel, or may be performed at different times.

The system, apparatus, article of manufacture, method, and computer program product embodiments disclosed herein are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing the system 100, DCRS 200, DCRS 300, DCRS 400, DCRS 500, DCRS 600, and DCRS 700, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for automatically generating fine-grained call reasons from customer service call transcripts, the computer-implemented method comprising:
   extracting, by an event extraction system using a natural language processing (NLP) technique, a set of events from a set of text strings of speaker turns, wherein said extracting comprises:
      feeding, by the event extraction system, the set of text strings of speaker turns to a logistic regression classifier trained to generate a set of probability values comprising a respective probability value for each speaker turn in the set of text strings of speaker turns, wherein each probability value in the set of probability values indicates a likelihood that a respective speaker turn contains natural language expressing a respective call reason; and
      extracting, by the event extraction system, each event in the set of events from the respective speaker turn in a respective text string of speaker turns having a highest-ranking respective probability value;
   identifying, by a cluster generation system, a set of clusters of events based on the set of events;
   labeling, by the cluster generation system, each cluster of events in the set of clusters of events to generate a set of labeled clusters of events; and
   assigning, by a cluster assignment system, each event in the set of events to a respective labeled cluster of events in the set of labeled clusters of events.

2. The computer-implemented method of claim 1, further comprising:
   feeding, by the cluster generation system, the set of events to a role factor network trained to generate a set of event embeddings that capture (i) distributional information associated with the set of events and (ii) interactions between arguments within the set of events; and
   identifying, by the cluster generation system, the set of clusters of events based on the set of event embeddings.

3. The computer-implemented method of claim 1, further comprising labeling, by the cluster generation system, each cluster of events using a graph-based sentence compression algorithm that generalizes lexical variations in the events of each cluster of events.

4. The computer-implemented method of claim 1, further comprising storing, by the cluster generation system, the set of labeled clusters of events in a cluster database.

5. The computer-implemented method of claim 1, wherein each event in the set of events comprises a constituent phrase comprising a subject, a verb, and an object.

6. The computer-implemented method of claim 1, further comprising:
   preprocessing, by a speaker turn preprocessing system, the set of text strings of speaker turns to at least one of clean, autopunctuate, or resolve co-references in the set of text strings of speaker turns before extracting the set of events from the set of text strings of speaker turns.

7. A non-transitory computer readable medium including instructions for causing a processor to perform operations for automatically generating fine-grained call reasons from customer service call transcripts, the operations comprising:
   extracting, using a natural language processing (NLP) technique, a set of events from a set of text strings of speaker turns, wherein said extracting comprises:
      feeding the set of text strings of speaker turns to a logistic regression classifier trained to generate a set of probability values comprising a respective probability value for each speaker turn in the set of text strings of speaker turns, wherein each probability value in the set of probability values indicates a likelihood that a respective speaker turn contains natural language expressing a respective call reason; and
      extracting each event in the set of events from the respective speaker turn in a respective text string of speaker turns having a highest-ranking respective probability value;
   identifying a set of clusters of events based on the set of events;
   labeling each cluster of events in the set of clusters of events to generate a set of labeled clusters of events; and
   assigning each event in the set of events to a respective labeled cluster of events in the set of labeled clusters of events.

8. The non-transitory computer readable medium of claim 7, wherein the operations further comprise:
   feeding the set of events to a role factor network trained to generate a set of event embeddings that capture (i)

distributional information associated with the set of events and (ii) interactions between arguments within the set of events; and identifying the set of clusters of events based on the set of event embeddings.

9. The non-transitory computer readable medium of claim 7, wherein the operations further comprise labeling each cluster of events using a graph-based sentence compression algorithm that generalizes lexical variations in the events of each cluster of events.

10. The non-transitory computer readable medium of claim 7, wherein the operations further comprise storing the set of labeled clusters of events in a cluster database.

11. The non-transitory computer readable medium of claim 7, wherein each event in the set of events comprises a constituent phrase comprising a subject, a verb, and an object.

12. The non-transitory computer readable medium of claim 7, the operations further comprising:

preprocessing the set of text strings of speaker turns to at least one of clean, autopunctuate, or resolve co-references in the set of text strings of speaker turns before extracting the set of events from the set of text strings of speaker turns.

13. A computing system for automatically generating fine-grained call reasons from customer service call transcripts, the computing system comprising:

a storage unit configured to store instructions;

a control unit, coupled to the storage unit, configured to process the stored instructions to:

extract, using a natural language processing (NLP) technique, a set of events from a set of text strings of speaker turns, wherein, to extract the set of events, the control unit is further configured to:

feed the set of text strings of speaker turns to a logistic regression classifier trained to generate a set of probability values comprising a respective probability value for each speaker turn in the set of text strings of speaker turns, wherein each probability value in the set of probability values indicates a likelihood that a respective speaker turn contains natural language expressing a respective call reason; and extract each event in the set of events from the respective speaker turn in a respective text string of speaker turns having a highest-ranking respective probability value;

identify a set of clusters of events based on the set of events;

label each cluster of events in the set of clusters of events to generate a set of labeled clusters of events; and assign each event in the set of events to a respective labeled cluster of events in the set of labeled clusters of events.

14. The computing system of claim 13, wherein the control unit is further configured to process the stored instructions to:

feed the set of events to a role factor network trained to generate a set of event embeddings that capture (i) distributional information associated with the set of events and (ii) interactions between arguments within the set of events; and identify the set of clusters of events based on the set of event embeddings.

15. The computing system of claim 13, wherein the control unit is further configured to process the stored instructions to label each cluster of events using a graph-based sentence compression algorithm that generalizes lexical variations in the events of each cluster of events.

16. The computing system of claim 13, wherein the control unit is further configured to process the stored instructions to store the set of labeled clusters of events in a cluster database.

17. The computing system of claim 13, wherein the control unit is further configured to:

preprocess the set of text strings of speaker turns to at least one of clean, autopunctuate, or resolve co-references in the set of text strings of speaker turns, and wherein, to extract the set of events from the set of text strings of speaker turns, the control unit is configured to extract the set of events from the preprocessed set of text strings of speaker turns.

* * * * *